US007480746B2

(12) United States Patent
Simon et al.

(10) Patent No.: US 7,480,746 B2
(45) Date of Patent: Jan. 20, 2009

(54) EXTENSIBLE UNIVERSAL HOME AUTOMATION INTEGRATION FRAMEWORK AND USER INTERFACE

(75) Inventors: Christopher T. Simon, El Dorado Hills, CA (US); Steven C. Rylander, Elk Grove, CA (US)

(73) Assignee: Home Xperience, Inc., El Dorado Hills, CA (US)

( * ) Notice: Subject to any disclaimer, the term of this patent is extended or adjusted under 35 U.S.C. 154(b) by 0 days.

(21) Appl. No.: 11/470,610

(22) Filed: Sep. 6, 2006

(65) Prior Publication Data

US 2007/0055390 A1 Mar. 8, 2007

Related U.S. Application Data

(60) Provisional application No. 60/716,246, filed on Sep. 6, 2005.

(51) Int. Cl.
| | |
|---|---|
| G06F 3/00 | (2006.01) |
| G06F 7/00 | (2006.01) |
| G06F 17/00 | (2006.01) |
| G06F 15/177 | (2006.01) |
| G06F 13/00 | (2006.01) |
| G06F 13/12 | (2006.01) |
| G06F 13/38 | (2006.01) |
| G05B 11/01 | (2006.01) |
| H04N 5/445 | (2006.01) |

(52) U.S. Cl. .................. 710/16; 700/19; 707/104.1; 710/17; 710/63; 715/734; 715/736; 725/59

(58) Field of Classification Search .............. 700/9, 700/17, 19, 20, 83; 707/104.1; 709/204, 709/205, 208, 217–219, 223, 224; 710/15–19, 710/62, 63; 711/100, 161; 715/716–719, 715/733–737, 740, 750; 725/37, 38, 59
See application file for complete search history.

(56) References Cited

U.S. PATENT DOCUMENTS 6,272,551 B1   8/2001  Martin et al.
6,564,056 B1 *  5/2003  Fitzgerald ................ 455/435.1

(Continued)

FOREIGN PATENT DOCUMENTS

JP    2006197487 A  *  7/2006

(Continued)

*Primary Examiner*—Crystal J Barnes Bullock
(74) *Attorney, Agent, or Firm*—Pillsbury Winthrop Shaw Pittman LLP

(57) ABSTRACT

A software architecture and methods that provide an extensible and intuitive interface to all digital managed resources in the residential environment. The application of data management methods will create a normalized representation of all potentially managed digital resources and a modularized and customizable presentation layer to provide tailored views of that content. The system will remain device and network independent, defining methods to support or rapidly incorporate existing and future devices and networks including but not exclusively: audio/video components; home appliances; computers; gaming devices; the Web; broadcast programming, other telecommunication capabilities; wired standards, CAT5, electrical and cable; wireless standards. The architecture provides methods for a heads up, context sensitive, simple point and click interface that are adapted to all current video display devices including remote hand held devices. Resource redundancy methods will also be included. Support methods that allows user configuration of new resources and content presentation will be provided.

14 Claims, 24 Drawing Sheets

U.S. PATENT DOCUMENTS

| | | | |
|---|---|---|---|
| 6,636,953 B2 * | 10/2003 | Yuasa et al. | 711/161 |
| 6,643,748 B1 * | 11/2003 | Wieland | 711/152 |
| 6,779,064 B2 * | 8/2004 | McGowen et al. | 710/104 |
| 6,792,323 B2 | 9/2004 | Krzyzanowski et al. | |
| 7,222,153 B2 * | 5/2007 | Ando et al. | 709/203 |
| 7,406,617 B1 * | 7/2008 | Athreya et al. | 714/4 |
| 7,412,538 B1 * | 8/2008 | Eytchison et al. | 709/245 |
| 2002/0199205 A1 * | 12/2002 | Sonawane et al. | 725/115 |
| 2003/0018491 A1 * | 1/2003 | Nakahara et al. | 705/1 |
| 2003/0140158 A1 * | 7/2003 | Lee et al. | 709/231 |
| 2004/0073610 A1 * | 4/2004 | Terada et al. | 709/203 |
| 2004/0249915 A1 * | 12/2004 | Russell | 709/223 |
| 2005/0027740 A1 * | 2/2005 | Moritani et al. | 707/104.1 |
| 2005/0037810 A1 * | 2/2005 | Bryson | 455/557 |
| 2005/0108279 A1 * | 5/2005 | Di Giuliani | 707/103 R |
| 2005/0114784 A1 * | 5/2005 | Spring et al. | 715/762 |
| 2006/0010383 A1 * | 1/2006 | Tanaka et al. | 715/716 |
| 2006/0112018 A1 * | 5/2006 | Lee | 705/59 |
| 2006/0117132 A1 * | 6/2006 | Gray et al. | 711/100 |
| 2007/0256021 A1 * | 11/2007 | Prager et al. | 715/744 |

FOREIGN PATENT DOCUMENTS

KR        2007008992 A    *   1/2007

* cited by examiner

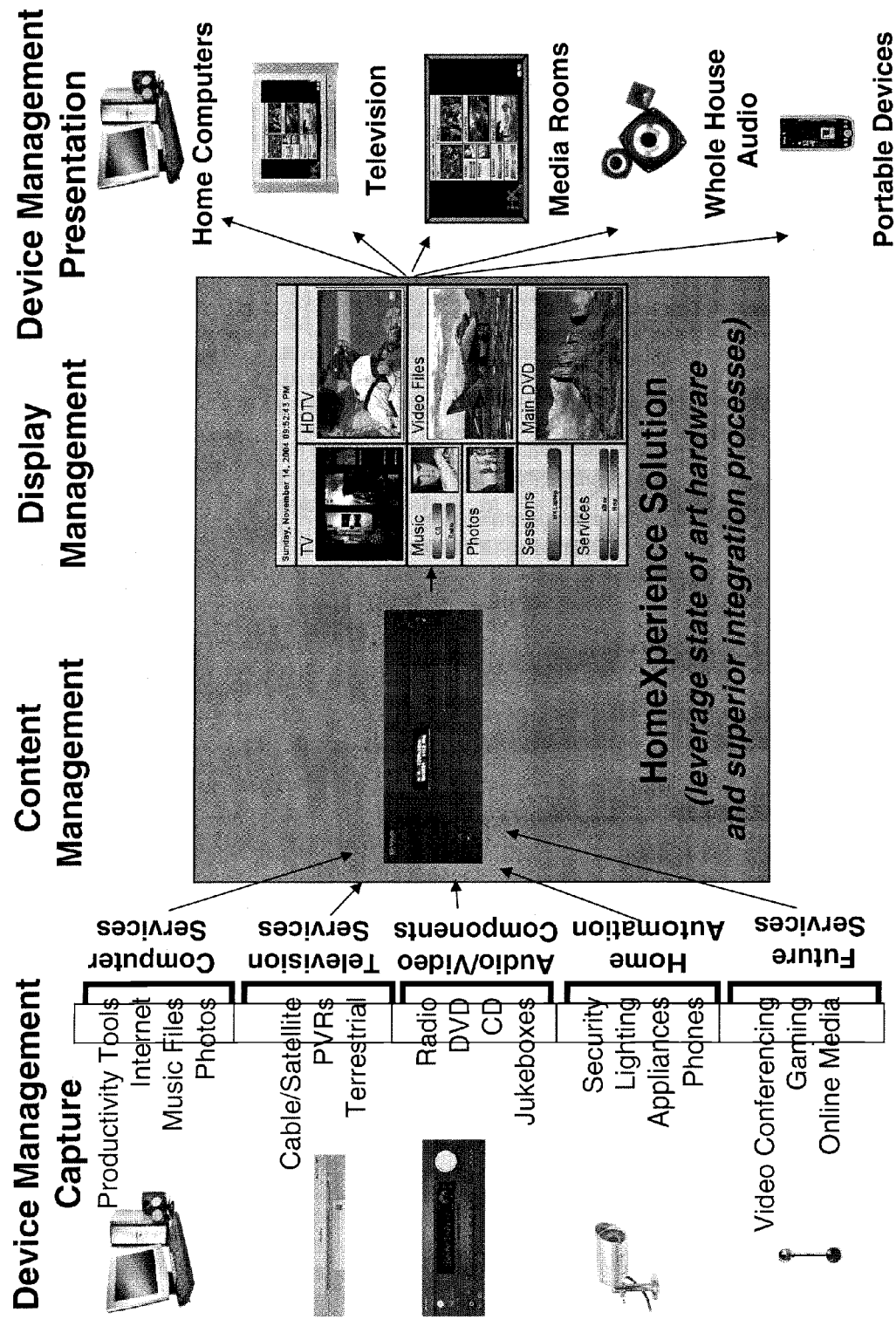
Figure 1A – General System

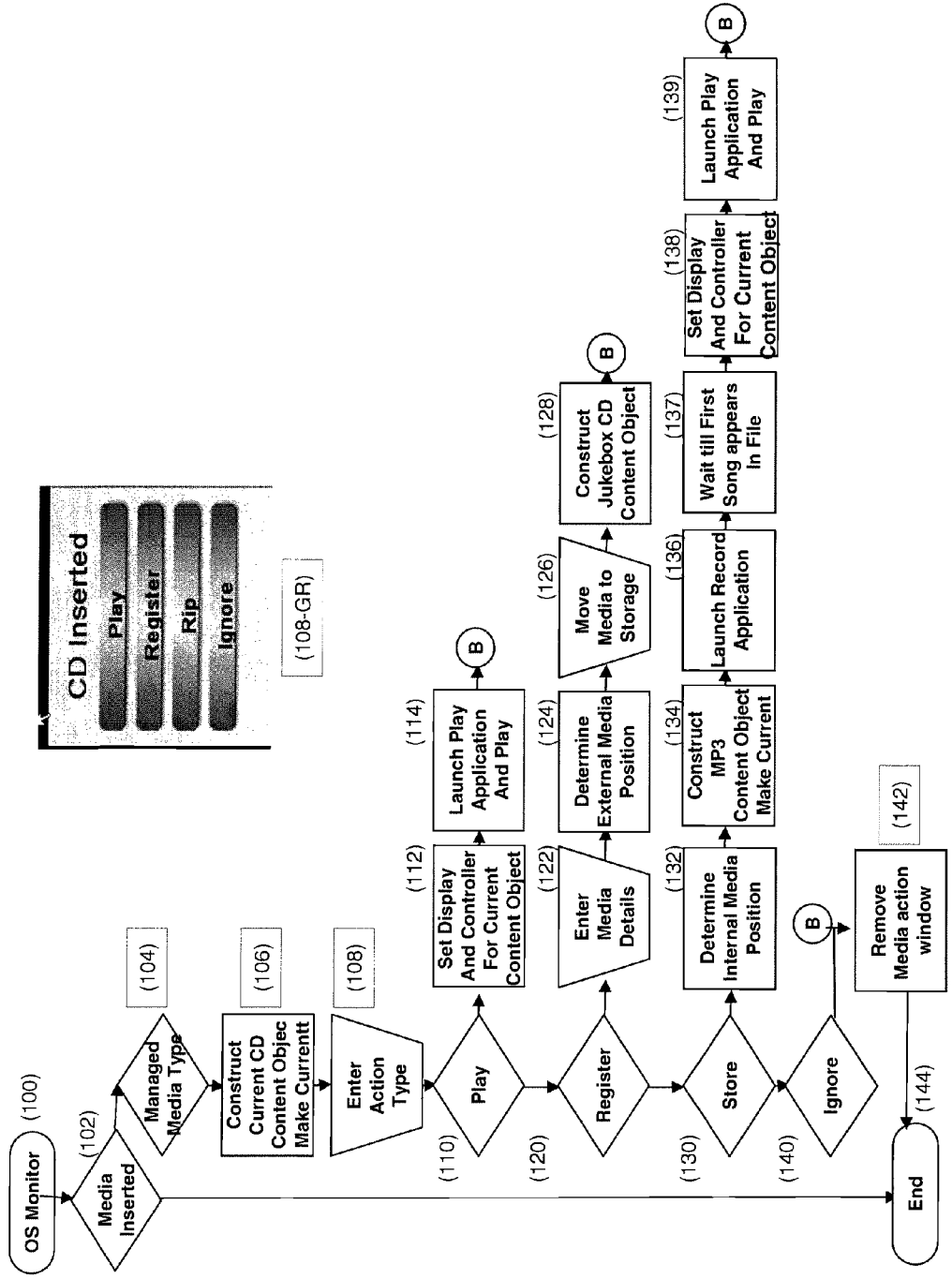
Figure 1B – New Media Registration Process

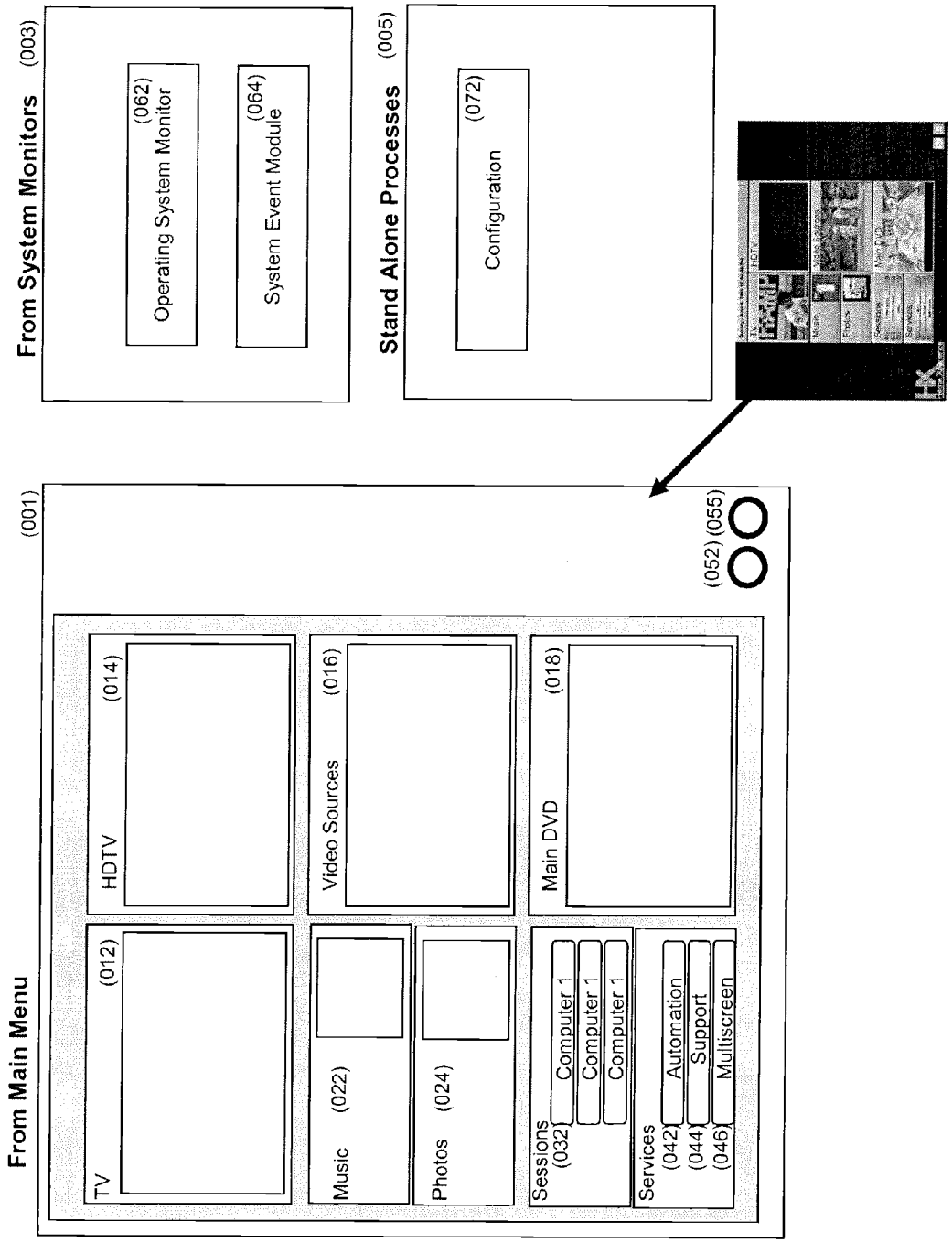
Figure 1C – Process Initiation

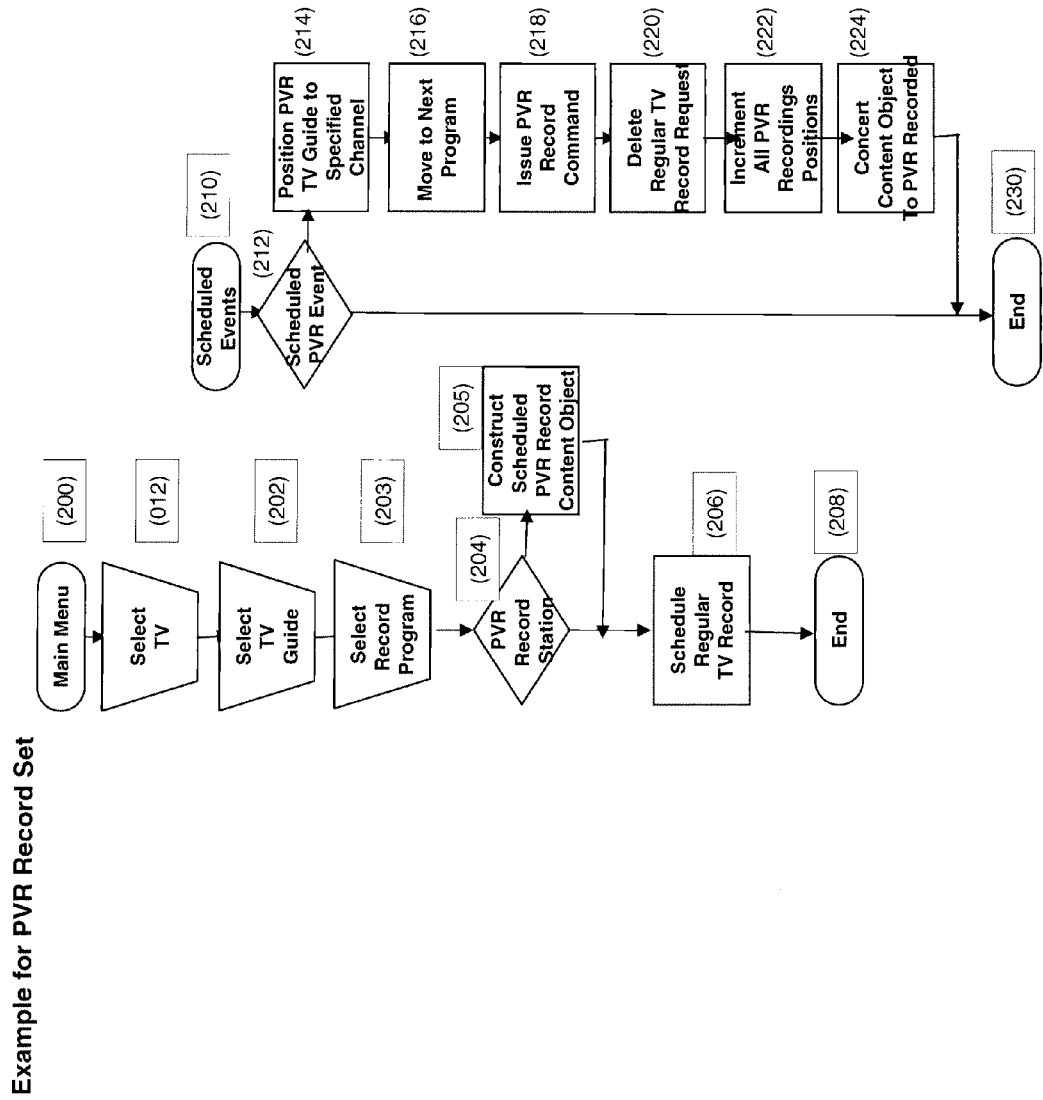
Figure 2A – Positional Device Interface Integration
Example for PVR Record Set

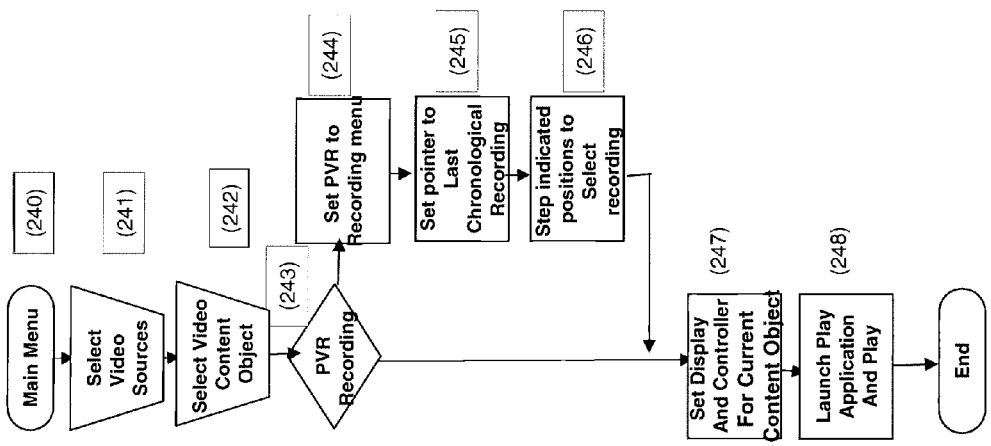
Figure 2B – Positional Device Interface Integration
Example for PVR Recording Playback

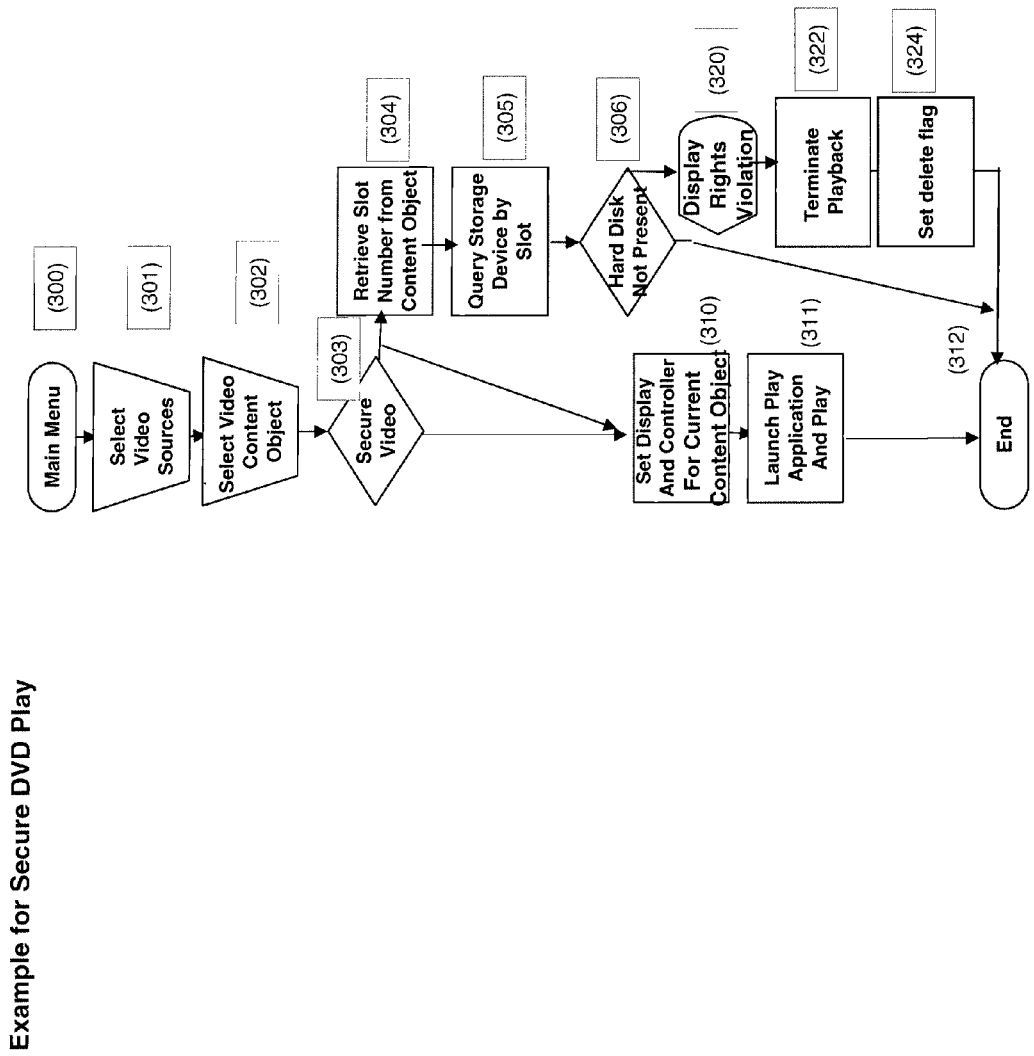
Figure 3 – Media Ownership Verification Process
Example for Secure DVD Play

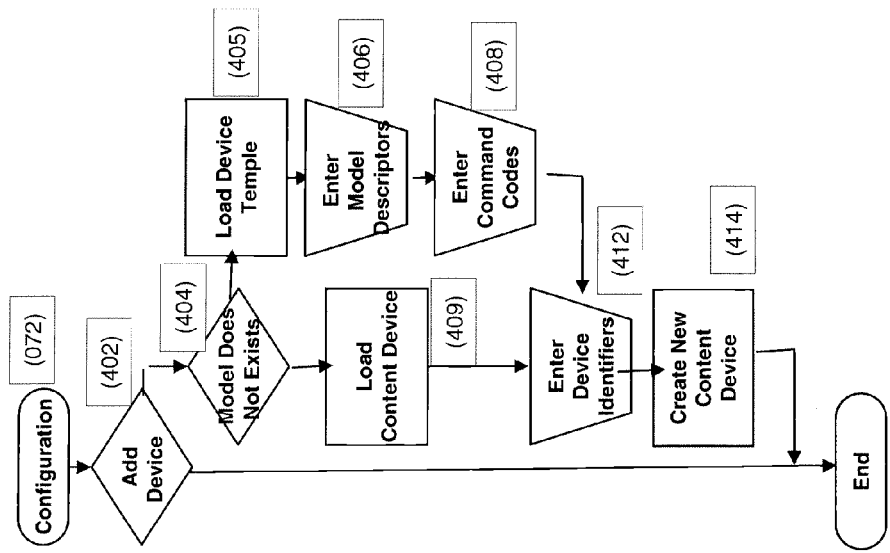
Figure 4A – Object Model Examples
Example – Connect New Juke Box to System

Figure 4B – Object Model Examples
Detailed Example – DVD Content Object in Current Jukebox
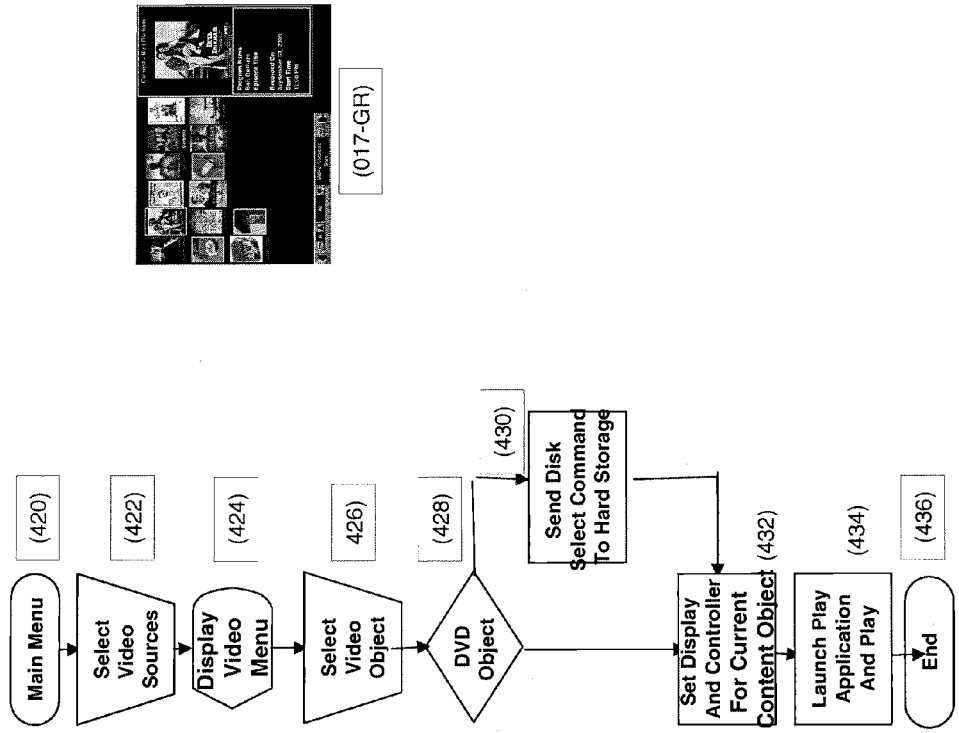

Figure 4C – Object Model Examples
Example – TV Channel Selection by Measured User
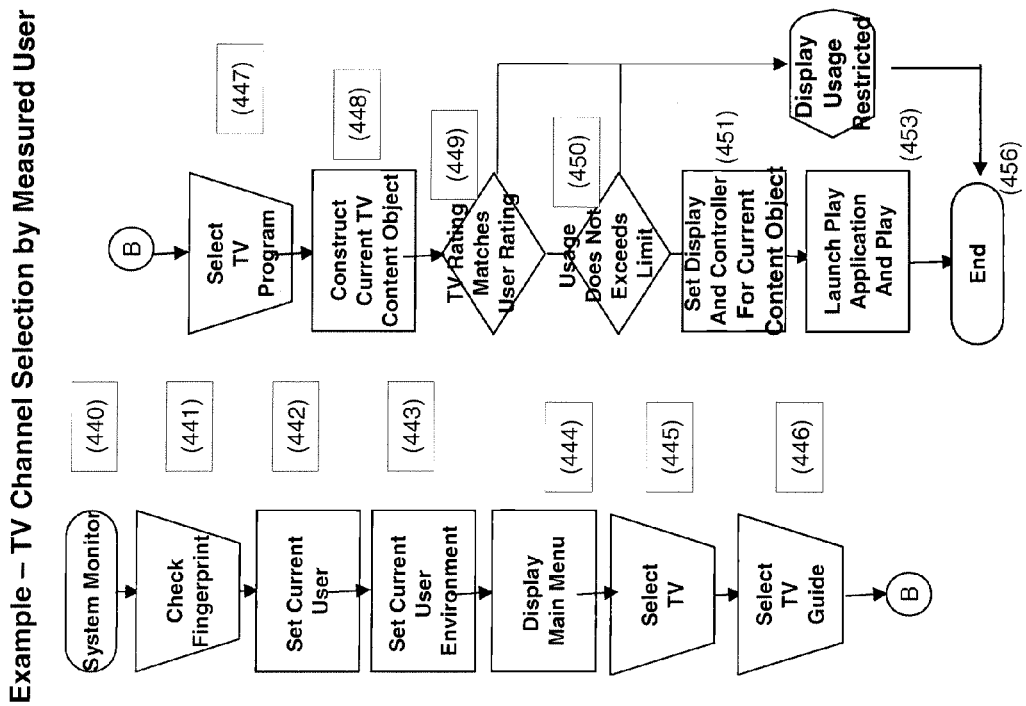

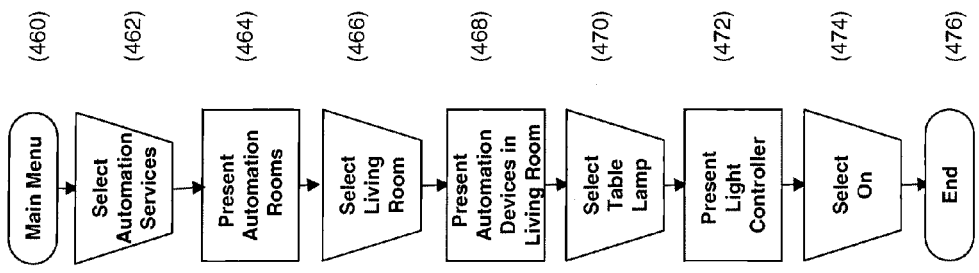
Figure 4D – Object Model Examples
Example – Light Management

Figure 5 – Key Data Structures

| | HX User | HX Element | HX Content Device | HX Content Object | HX Content Panel | HX Controller |
|---|---|---|---|---|---|---|
| Description | A a person or group of people that uses the HX system. | A generic class of device that is used to configure new instances of that device | A specific instance of a device and the instructions manage its behavour | A specific instance of content or control information | A assignable window for content to be organized and displayed | A set of graphical items that allow interaction between a user and specific content device |
| Examples | Dad<br>Parents<br>Administrators<br>Kids<br>Janie | A/V Receiver<br>Juke Box<br>PVR<br>VCR | Integra DTR6.5<br>Sony ES-777<br>Dish 921<br>JVC VC1280 | Elvis MP3<br>Star Wars 1 DVD<br>Discovery Channel<br>Master Bathroom Light<br>Radio KFBK | Content Display 1<br>Content Display 2<br>Video Player Display | TV Controller<br>DVD Controller<br>TV Guide Controller |
| Key Attributes | Name<br>Identification<br>Usage Counts<br>Permissions | Device Options Queries<br>Standard Command<br>Prompt List<br>Command Sequences<br>Config. Prompts<br>Communication Options<br>Associated Applications<br>Configuration Help<br>A/V Preferences | Device Options<br>Commands<br>Command Sequences<br>Communication Options<br>Usage Help<br>Hardware Assignment | Titling Info<br>Graphic Icon<br>Media Details<br>Usage and Favorite Classifications<br>A/V Preference Overrides<br>Managing Device | Display Device<br>Display Parameters<br>Set of HX Content Panels | Visual Format<br>Visual Style<br>Context Control Features |

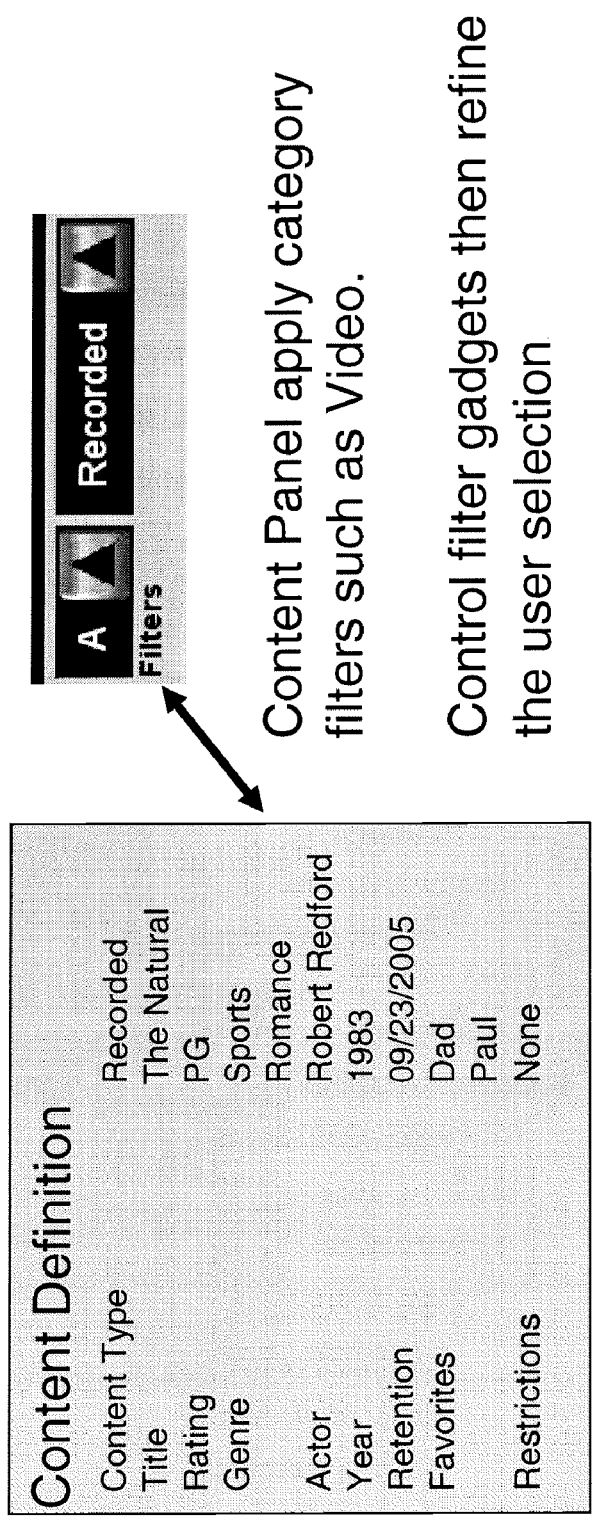
Figure 6 – Sample Content Filter Definition and User Access

Figure 7 – Example – NFL Sunday Group View
Activity – Select Favorite Multi-screen Display
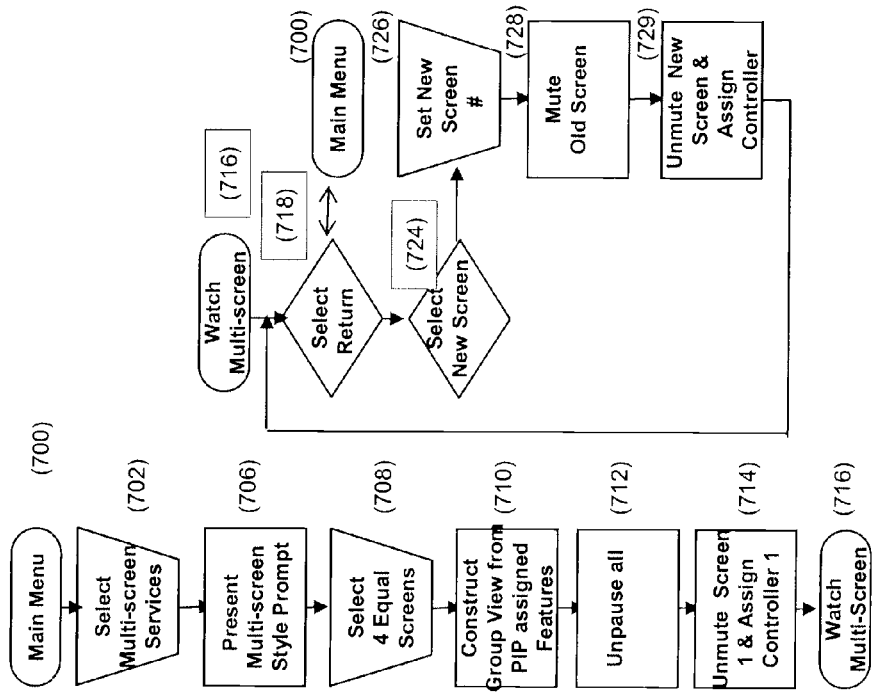

Figure 8 – Controller for Recorded Content

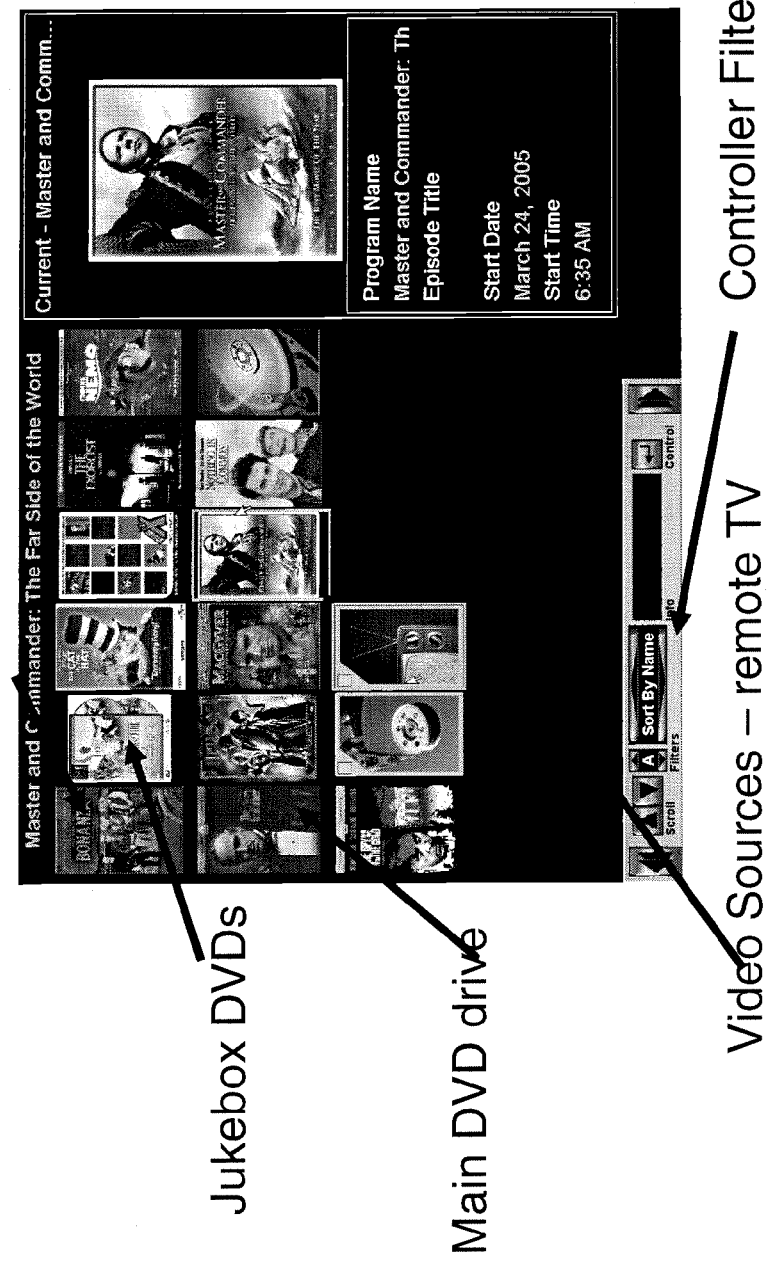
Figure 9 – Consolidate Video Content Menu

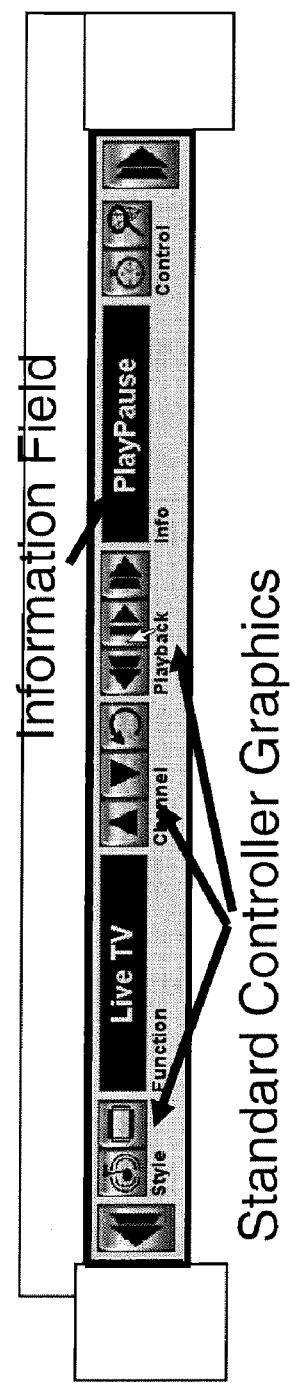
Figure 10 – Controller with Info Field

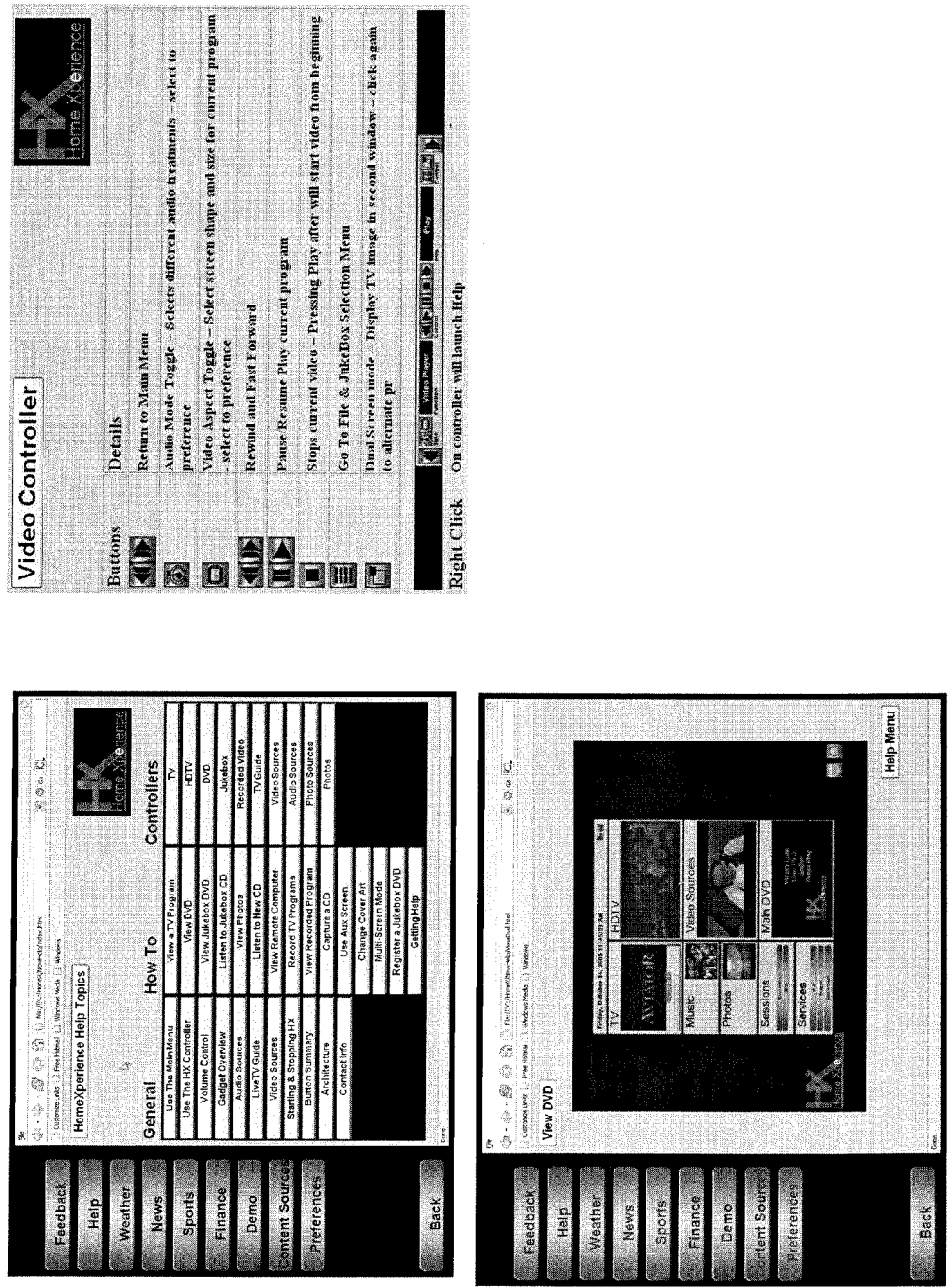
Figure 11 – Help Topic List & Example Controller Detailed Help

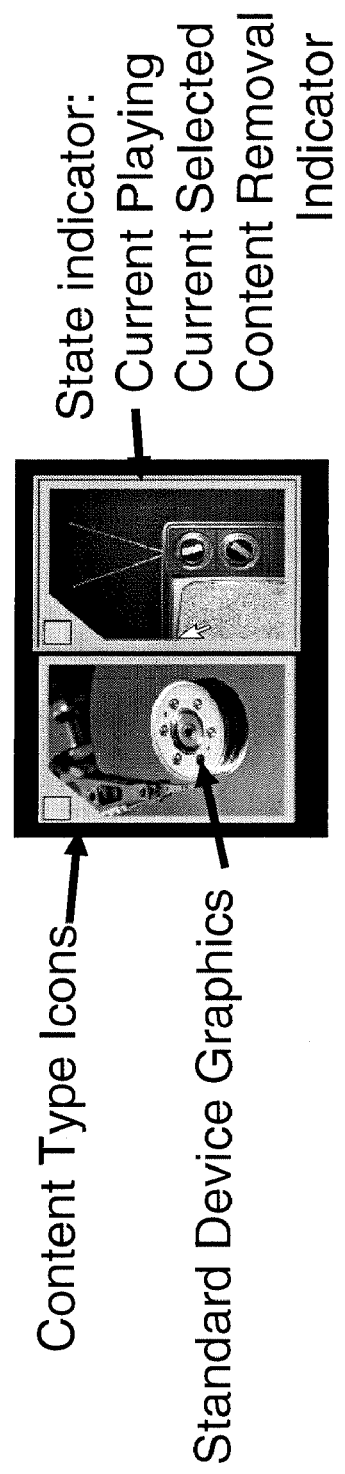
Figure 12 – Content Graphic and Cassette

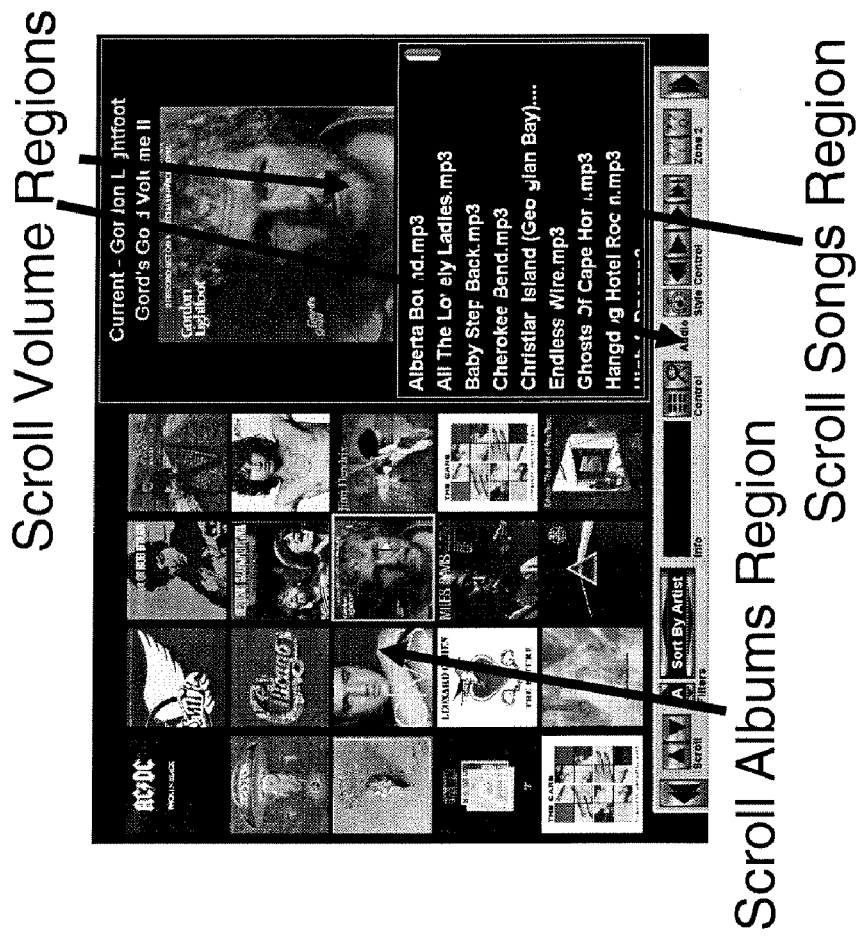
Figure 13 – Group View with Multiple Scroll Functions

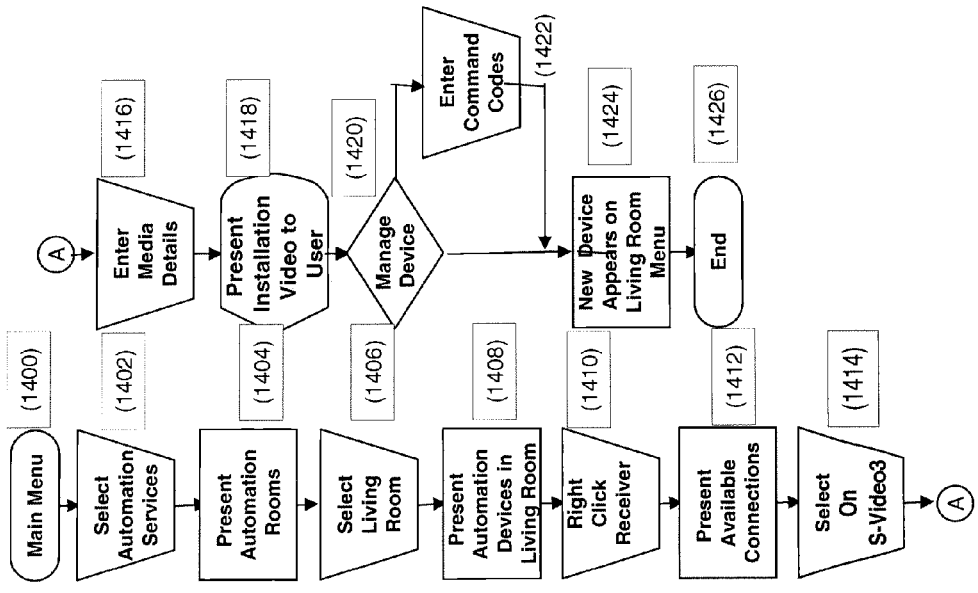
Figure 14A – A/V Receiver connectivity management
Example – Connect New VCR to System

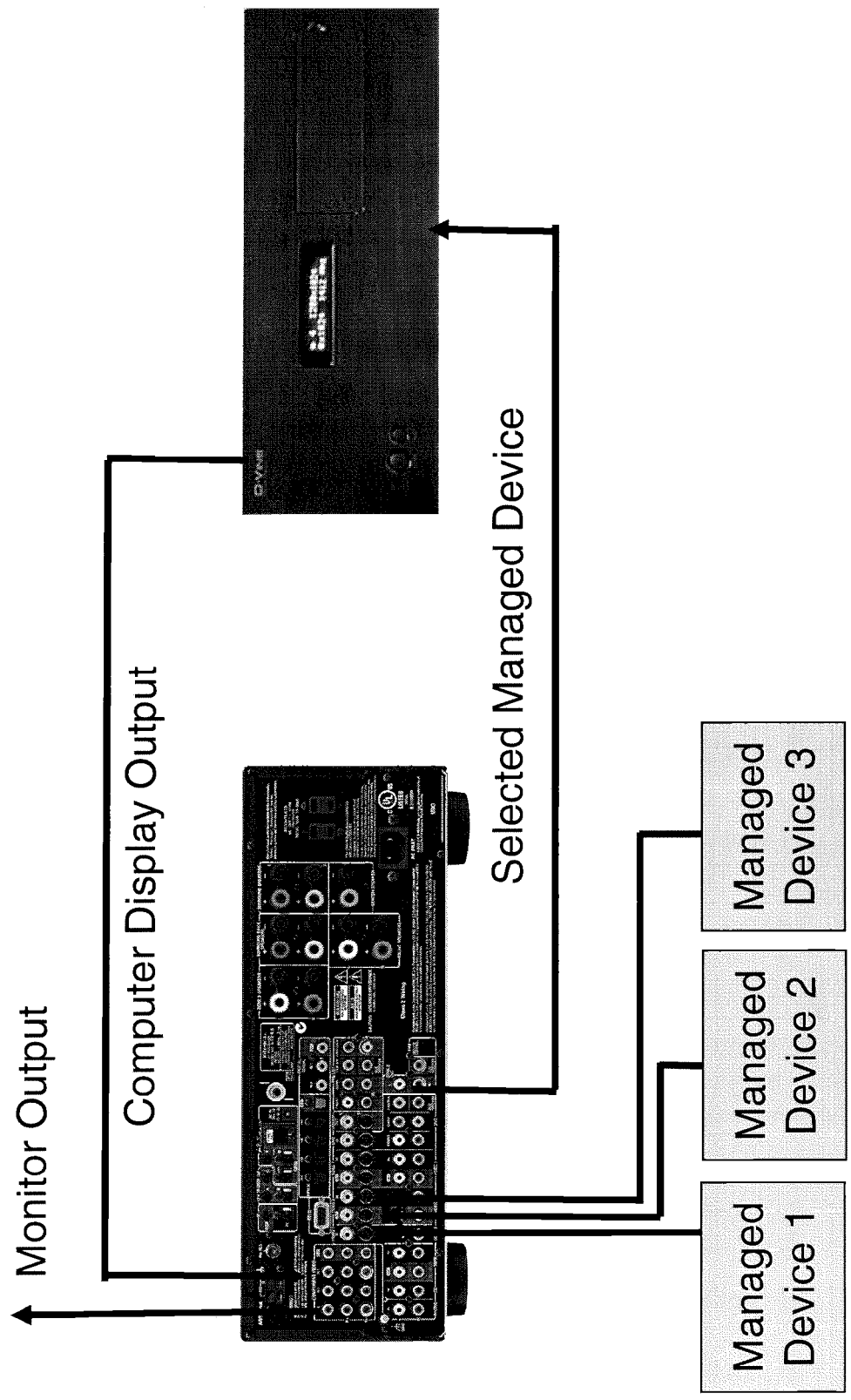
Figure 14B – A/V Receiver as a input switching device

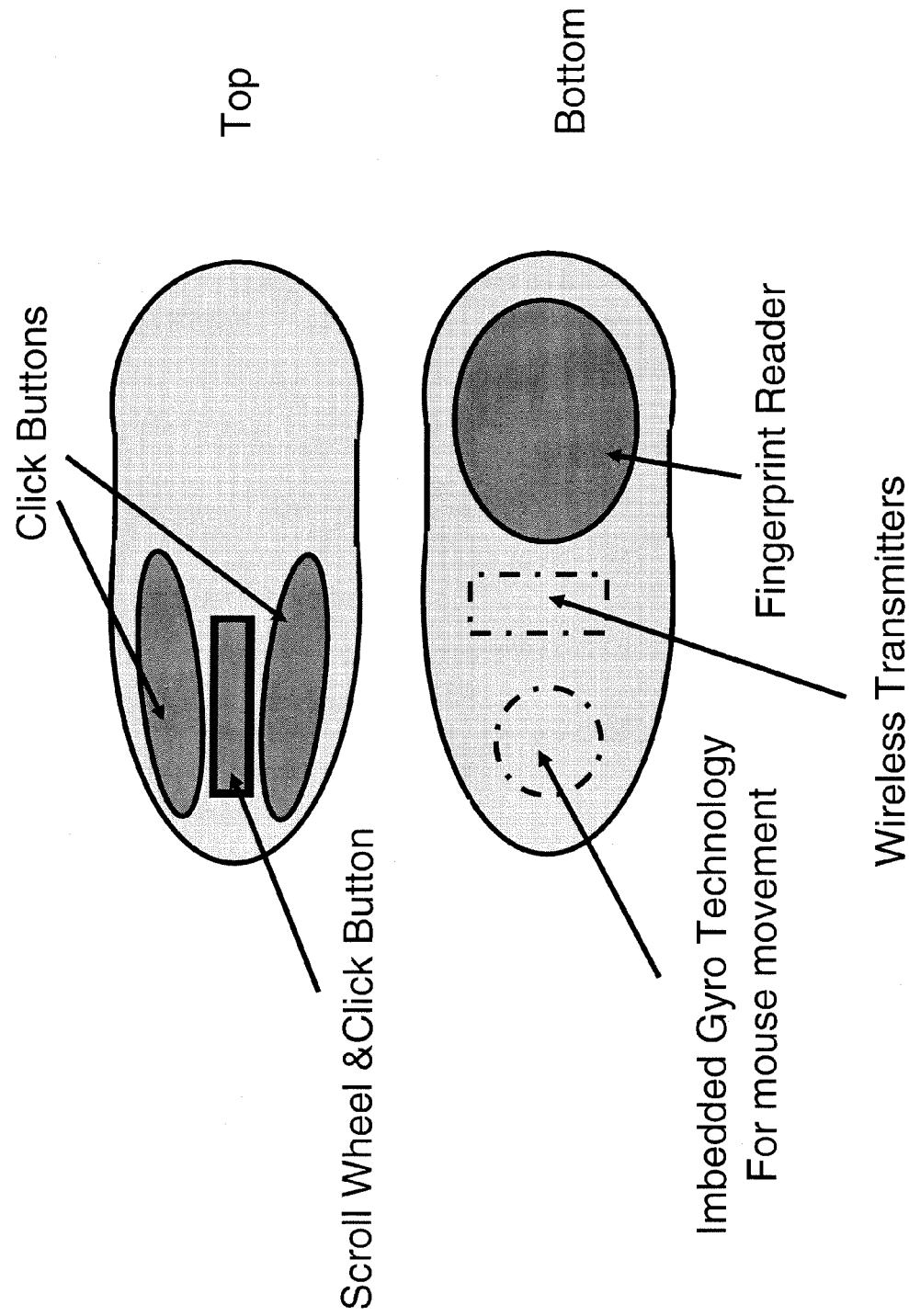
Figure 15 – Simple motion sensitive controller with fingerprint recognition

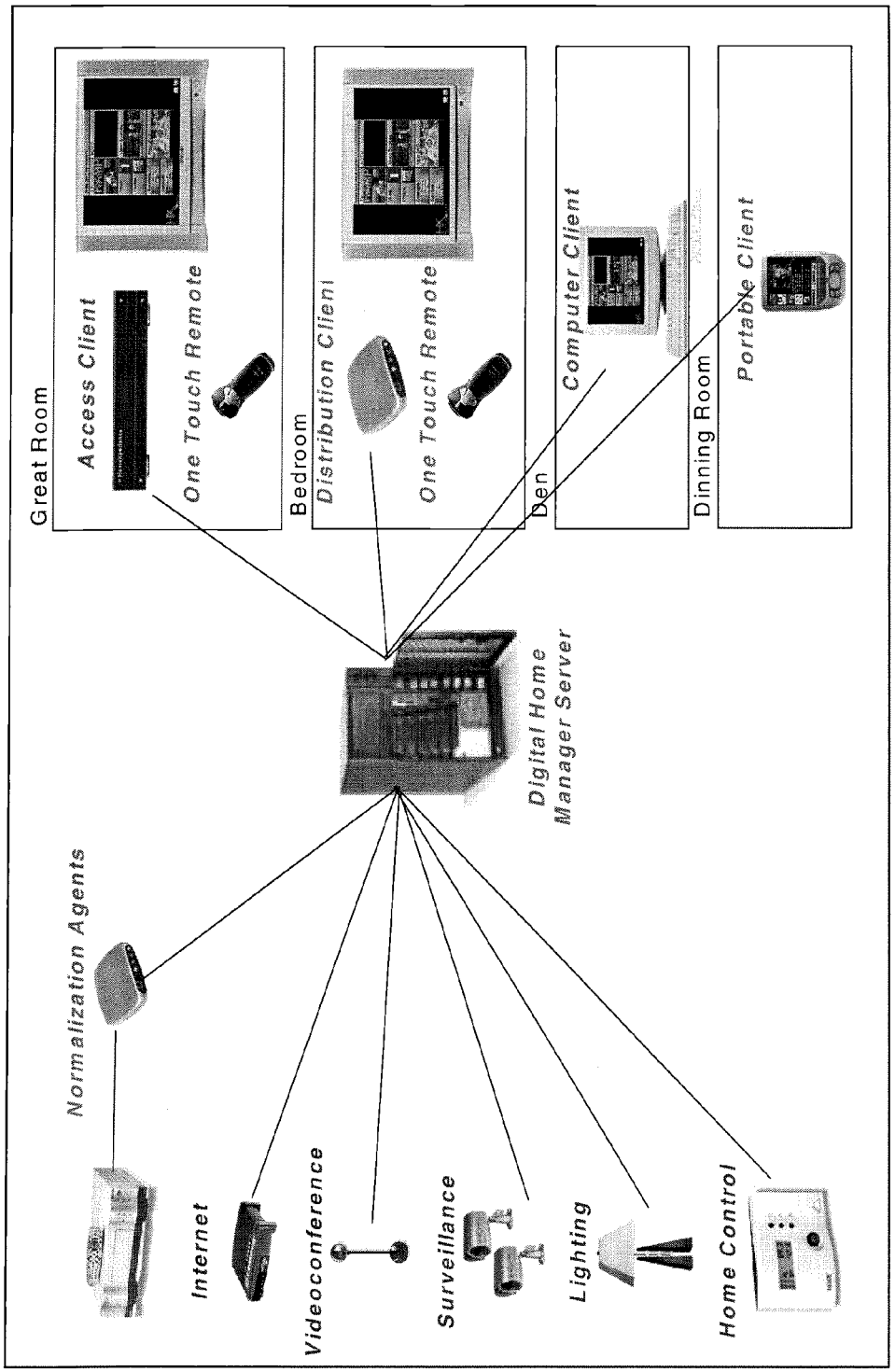
Figure 16 – Reference Architecture

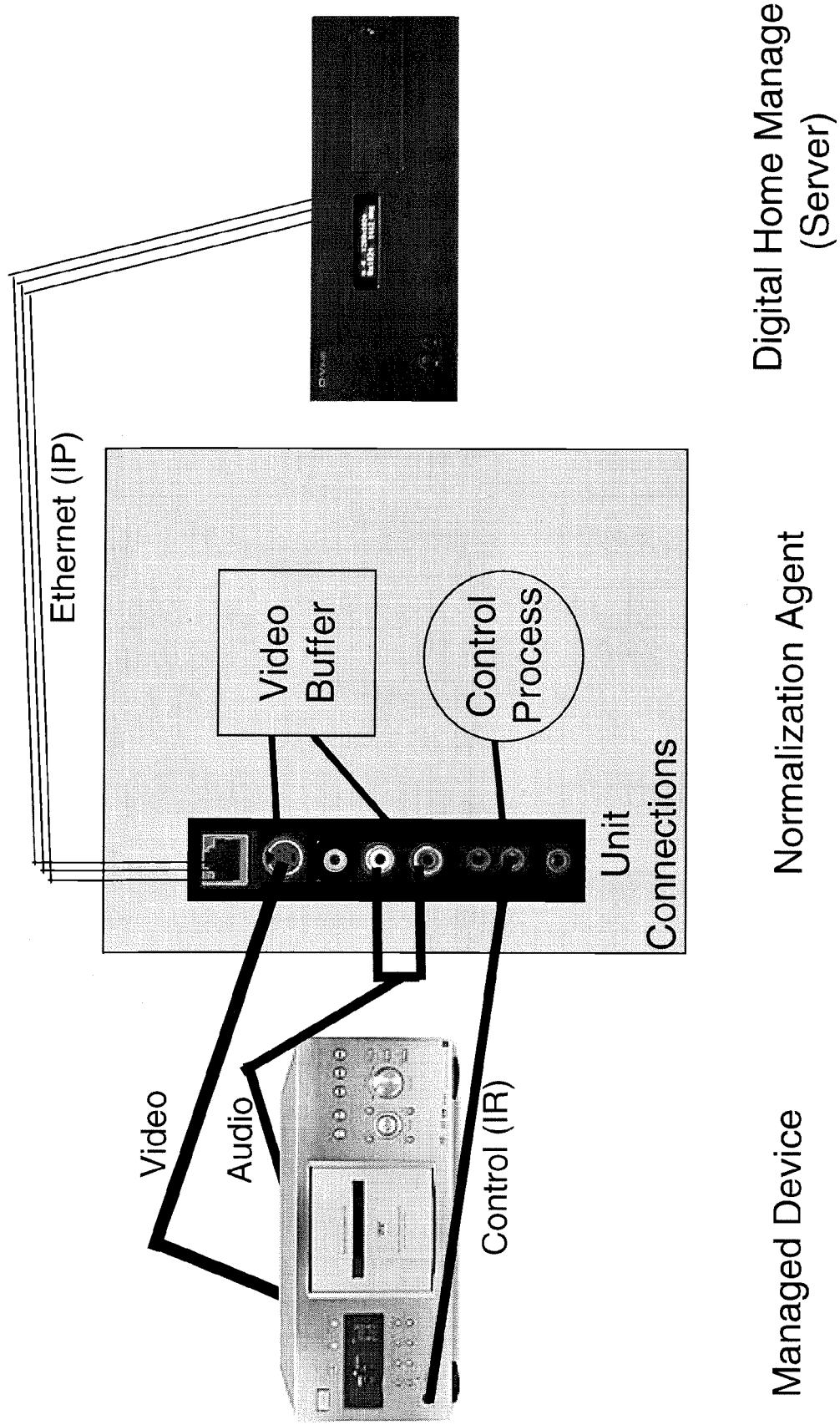
Figure 17 – Normalization Agent Platform

EXTENSIBLE UNIVERSAL HOME AUTOMATION INTEGRATION FRAMEWORK AND USER INTERFACE

CROSS-REFERENCE TO RELATED APPLICATIONS

The present application claims the benefit of U.S. provisional application Ser. No. 60/716,246, filed Sep. 6, 2005, entitled "EXTENSIBLE UNIVERSAL HOME AUTOMATION," which application is incorporated herein by reference for all purposes.

BACKGROUND

Home technology management is emerging as the second great digital convergent integration challenge, after the telecommunication industry. Both industries have undergone significant introduction of new services both in emerging digital products and also in enhancements to traditional technologies. Standards have evolved for formats and general use in these convergent markets to facilitate market uptake. However, techniques for managing the configuration, the interaction and the overall complexity of these services are limited. These techniques are not core competency of the major providers and in fact it may not be in their best interest to make other providers products easy to integrate. This business reality has plagued the telecommunication market for 20 years and has produced a multi-billion telecommunication management integration industry.

In the Home Automation market, managing the growing number of intelligent products has been mostly on an individual basis using simple universal remote solutions or very expensive custom integrations services. In all cases, the addition off a new service complicates, if not antiquates, these existing integration methods.

While, the introduction of the computer into the home services mix should alleviate the situation, the standard Home PC is not really equipped for broad integration as it does not naturally interface to non IP products well. Most households that today have a home network, in fact do not do inter home computer communication, but only provide access to the outside internet. The new Media Center class of computer is more focused on supplanting other services, mostly entertainment, and interfaces to other home technologies are limited and mostly hobbyist activity. There is utilization of computer technology in some newer home automation platforms. However, these products follow the component productization model and the true flexibility of the computer is lost.

What is required is the interjection of advanced computer and data architecture into the home market, designed primarily for an intuitive and extendable user experience. This design will provide the user with a Single Learning Curve for all the manageable features in, and addressable from their home, by applying ridged data management processes coupled with a extensible and flexible hardware and software framework to produce a home automation environment that intuitively manages a wide variety of digital appliances, automation and audio video components present in the market today. More importantly the architecture is easily adaptable to new home devices and communication technologies both internal and external.

SUMMARY

The inventions described herein relate to data techniques required to manage the home environment and quickly adapt to both new technologies and customer usage patterns. The focus of the invention is to provide data structures and software processes that allow home users to manage diverse home automation data content in a flexible and intuitive manner independent of actual devices or networks involved.

In addition, other specific inventions will be detailed that make the use of these data structures intuitive to the end user and provide an extensible supporting hardware architecture.

BRIEF DESCRIPTION OF THE DRAWINGS

FIG. 1A shows the key differentiation of the invention, focused on the Content and Display Management features;
FIG. 1B shows the new media registration process;
FIG. 1C Process Initiation chart;
FIG. 2A shows the positional device interface record integration;
FIG. 2B shows the positional device interface playback integration;
FIG. 3 shows the media ownership verification process;
FIG. 4A object model example—connect new device;
FIG. 4B object model example—retrieve media from hard media storage;
FIG. 4C object model example—manage TV access;
FIG. 4D object model example—control automation device
FIG. 5 shows key data structures;
FIG. 6 shows sample content filter definitions and user access;
FIG. 7 is an example of a group view;
Fig. 8 shows a controller for playback of a TV recording;
FIG. 9 shows a consolidated video content menu;
FIG. 10 shows a Controller with Info Field;
FIG. 11 is an example of various Help layers;
FIG. 12 shows content graphic and cassette menus; and
FIG. 13 shows a group view with multiple scroll functions.
FIG. 14A A/V Receiver connectivity management
FIG. 14B A/V Receiver as a input switching device
FIG. 15 Simple motion sensitive controller with fingerprint recognition.
FIG. 16 Reference Architecture Diagram.
FIG. 17 Normalization Agent platform.

DETAILED DESCRIPTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such.

Further, the present invention encompasses present and future known equivalents to the components referred to herein by way of illustration.

Certain embodiments of the invention provide a home content object. The home content object is typically implemented as a data object that can universally define operating characteristics of any device, feature or service that can be electronically accessed from within the home. The home content object can facilitate use and operation of the defined device, feature or service. Management systems and processes can operate and manipulate the underlying device, feature or service defined by the home content object without knowledge or understanding of specific characteristics of the device, feature or service. Common functions and operations can be performed as appropriate to a device feature or service based on the content of a corresponding home content object. Furthermore, certain embodiments of the invention provide an architecture that enables rapid development and adoption of new content types. This architecture may facilitate future process enhancements and provide true management—rather than simple control—of a home environment.

Home Content Object—Normalization

In certain embodiments, each feature the home content object may be normalized. With reference to FIG. 5, normalization can be achieved using data structures that define the nature of each feature so that a home digital resource management system can identify all aspects associated with management of the feature and can automatically incorporate the feature into existing presentation and selection structures. The data structures may include a set of attributes that define presentation information (how the home content object appears to a user), specific audio-video adjustments, availability information, favorite pattern definitions, material ratings, material description and reviews, identification of associated processes, access restrictions, history and limits of use, relationships with other home content objects, command sequences associated with control and any other information that will enhance use of the associated feature.

FIG. 4A provides a flowchart describing one example of a method for configuring a newly connected jukebox in a system. Typically, a user selects a configuration option or menu at step 72 (see FIG. 1C). The configuration process can be a menu-based standalone process that allows the user or installer to add new capability to the system. At step 402, the user may select an option to add a device and the system will typically provide a list of candidate devices for connection. In many embodiments, the list can be generated based on definitions of currently supported devices maintained in the system. In some embodiments, the system may be able to determine certain characteristics of the new device based on identifiable features discovered when the new device is connected to the system. For example, a list of optical drives and MP3 players may be presented where the system recognizes a mass storage device containing multimedia content. If at step 404, the device type is previously defined in the system, the user may select or affirm a prompted selection identifying the device at step 409 and proceed to step 412.

If at step 404 the device is determined to be previously undefined, the system will use the default device definition (JukeBox Default Content Device in this example) at step 405 and the user may be prompted at step 406 to provide device characteristics at step 406. Device characteristics may include device components, behaviors, capacities and capabilities. For example, device characteristics of a juke box can include quantity of slots, formats, audio levels and so on. Next, at step 408 the user may be prompted to provide control data for the new device. Control data may be obtained from device documentation and can be provided empirically by, for example, prompted operation of an IR controller to obtain signal characteristics. Having defined device characteristics, the device type may be recorded as a known device at step 412.

At step 412, instance data may be recorded for the new device. The user may be prompted for specific instance setup such as connection hardware used, communication port identification and a name. At step 414, a Jukebox Content Device can be saved for the new device. In certain embodiments, new device type configuration information may be forwarded to a central server for testing and validation. Validated home content objects may be added to a central library of managed devices and distributed as necessary to other home systems via regular internet upgrades.

In certain embodiments, multimedia content may be displayed to a user to assist configuration of devices in a system. This content may be derived from a server, from optical disk or other storage or from a third party server (e.g. an Internet site).

FIG. 4B provides a flowchart that describes one example of a process of viewing a video recording that has been stored in an external hard storage device, in the example of the jukebox. In the example, a user typically begins on a Main Menu at step 420. The Main Menu display may be defined in a configuration file such as a Userload Configuration File which defines feature modules included in the system, and a desired arrangement of the Main Menu. Style elements, including background textures, graphics and fonts may be initially defined in Userload Style settings and can typically be modified by the user in a Support/Preference section of the system. In one example, a left click of a hand controller on any of the Main Menu Panel may cause that feature to become prime.

At step 422, the user can select a Video Source panel on the Main Menu. The system in step 424 typically sets the display to the Video Source Panel which defines aspects of the display format including size and style. In this example, the system generic menu structure is utilized wherein, the menu includes a large area to display content graphic icons on the left and two areas to display details of selected content objects on the right. See Item 017-GR. This step may also include setting the controller to Video Source Controller. This controller typically comprises attributes that describe features including location where the controller is positioned, e.g. at the bottom of the screen, and control features such as content filters and sort criteria.

At step 426 the user may use the features of the Video Source Panel to locate a desired content object. A left click may select the content object for viewing. A right click may set the content object to edit mode in which descriptors can be changed and the object can be deleted from the system.

At step 428 the selected content object can be identified as a Jukebox Video Content Object. At step 430, the system may retrieve the command sequences for DVD play from the Jukebox Content Device that contains the selected Jukebox Content Object. The system may execute an associated command sequence to select the DVD by slot number, typically obtained from the content object attribute, and initiates audio/video playback through assigned management hardware on the system platform.

At Step 432, an appropriate content panel and controller and application info from the Jukebox Content Device may be retrieved. The system may set up an appropriate display and controller for a Jukebox Content Object and, at step 434, an associated application for playing a Jukebox file can be launched and a play command is issued before the process ends at step 436.

The user watches the video and can make changes to the payback position, aspect ratio, sound mode, color settings from the assigned controller. The user can leave the video session and return to the Main Menu or the Video Source Panel to select new content. The video is not completely released until another Video Content Object is selected.

FIG. 4D provides a flowchart that describes an example of a process for turning a light on in a specific room commencing at step 460 and ending at step 476. The example demonstrates the use of systems standard content object and display structures to manage and control automation devices. At step 462, the user may select the automation service of the system from the main menu and the automation button on the Service Function. At step 464, the system may use a generic menu structure with specific filters to display all content objects that are room content objects. The user may then select the living room content object at step 466. Typically, the menu filters the display to Automation Content Objects contained in the Living Room object at step 468. At step 470 the user can select the table lamp. The system may then obtain the associated controller from the selected object and present the control functions to the user at step 472. At step 474 the user can select one of a plurality of control functions, including for example, an on button associated with the current controller. The system may then send a control sequence to a lighting control device associated with the current Automation object.

Depending on the nature of the feature being normalized, software and hardware, may be needed to collect and manage these features. Other inventions will be defined that allow for the creation, maintenance and enhancement of these data objects, as well as specific inventions for normalization of common home devices that do not readily integrate with data management processes.

Home Content Object—Creation

Home Control Objects are created a number of ways. Where viable an automated process will be provided to recognize and incorporate new Home Content Objects into the system. User manual input maybe required to confirm, add additional information or preferences, or create custom objects, such as personal music play lists, to enhance the system.

This embodiment of the invention encompasses the act of managing the capture of source content required by the end user. FIG. 1A (Device Management Capture). Content can include audio/video media and/or control processes. This content will include the media elements such as TV, Radio, CDs, DVD, Computer file and Internet sources. More advanced capture sources will include; videoconferencing, remote computer management, web access and control processes for automation products such as lights, thermostats, cameras, spas and irrigation systems.

As most of the communication protocols are dictated by the content and component providers, the physical interfaces are not areas of distinction. Available IR, Serial RS232, IP and other standard communication processes will be utilized to control most managed devices. Flow of Audio/Video content will be facilitated over normal Audio/Video transport modes such as Composite, S-Video, Component, Firewire and DVI and converted to computer based formats via commercially available hardware. However, there are a number of areas where new inventions help maintain the Home Content Object structure and add unique capabilities to the user in the areas of easy of use, specialized managed elements and ease of current and future integration Digital Media Use and Store Feature Turning now to FIG. 1B, the inclusion of existing, recently purchased or personally produced media may be expedited in various manners. For example, a home digital resource management system may be configured to automatically recognize the insertion of new media in any system entry point, including CD/DVD Drives, USB ports and flash memory reader. Upon recognition of insertion of new media, the system may prompt the user to select a use for the media. For example, common usage options can include play, play and store, register new media in storage (e.g. hard or transient storage), and add to current menu and ignore. One advantage enjoyed by the user is that existing usage patterns such as playing CDs can be utilized to unobtrusively incorporate common content into an automated environment.

FIG. 1B provides a flowchart describing an example of a method to create a new home content object from a CD placed in a drive of a device managed by the system. The device can be any device equipped to receive CDs including computers, CD players, DVD players and audiovisual combination equipment. At step 100 the system may monitor the managed device for new media insertion notification. Monitoring can include monitoring an operating system, control lines and communication signals associated with the device. Upon receipt of notification of inserted media at step 102, the system may verify at step 104 that the inserted media is a media type managed by the system. In the present example, the system is configured to manage an audio CD media type and an appropriate procedure will be initiated to control operations associated with the audio CD. A same or similar process can recognize DVDs, photographic or music files inserted into a DVD/CD drive, or on memory sticks and flash memory. Likewise, similar processes can be provided for monitoring shared network resources, including media files maintained or delivered by networks. At Step 106, the system may create a new home content object for the newly inserted CD, identifying the CD as the Current CD in Main Drive, for example. In certain embodiments, the system may query Internet-based resources or some other network resource for associated CD graphics, play list and text descriptions.

At step 108, the user may be presented with an action panel (see, e.g. 108-GR), that typically allows the user to specify what action should be taken with regard to the new media. In the example, when the user selects the Play function at step 110, the system may select an appropriate display and controller for home content object Current CD in Main Drive at step 112 and, at step 114, launch a corresponding application for playing the CD in the drive and send a play command the application. Upon completion, control of the process may be passed to step 142 as described below.

If the user selects the Register function at step 120, the register function can be invoked to assign the new CD to a slot in an external media storage device such as a jukebox. The Register function may also create a home content object for a Jukebox CD. At step 122, the user may be enabled to modify information associated with the CD. At step 124, the system may retrieve the next available slot number from the JukeBox Device object and, at step 126, may instruct the user to take the CD from the main drive and place in the specific slot of the specified Jukebox. At step 128, a new Video Content Object can be created.

If the user selects the Play and Record function at step 130, the system may unobtrusively integrate the user environment by absorbing the user's personal media simply by playing it.

At step 132 the system can determine a file structure that the recorded media will be stored in and uses this information at step 134 where the new MP3 Content Object is created. In step 136 the application for recording the CD content can be launched. At step 137 the system may monitor the defined file structure and when at least one MP3 file is created, the system can set up the appropriate display and controller for home content object MP3 at step 138. At step 139, an associated application may be launched for playing an MP3 file and a play command is typically issued. The MP3 play process will run in the Music Source window as usual while the record process runs in the background to completion. The CD is now resident in the system. Upon completion or at some other point determined by user command, control of the process may be passed to step 142 as described below.

If the user selects Ignore or Inaction at step 140, control of the process may be passed to step 142 as described below. Typically, the Current CD in Main Drive remains available to system via any music or device menu. The object may be removed at step 144 when the CD is physically removed from the system.

In step 142 the current action panel is removed from the display.

Positional Device Management

Many existing home devices have simplistic and/or non responsive interfaces. In certain embodiments of the invention, users may add these existing devices to their managed environment. Processes to allow positional cursor management of these processes coupled with enforced usage constraints such as using the management system to manage specified actions, will typically permit these devices to be included in the managed environment, as shown in FIGS. 2A and 2B. This capability may allow the content to be presented in a consolidated fashion within the home digital resource management systems control and menu elements.

In one example, integration of a PVR unit that does not have a bidirectional control interface can be integrated into the management system. In the example, a user can select recording within the management system and, by managing the PVR using IR positional requests, the PVR recording can become part of the managed system content. Other uses for the process include integrating an appliance controller with positional buttons and a simple up/down/select controller. Familiar control graphics can be substituted and the feature incorporated in the home digital resource management system.

Referring to FIGS. 1C and 2A, flowcharts are provided that describe examples of processes for scheduling a recording event for an external PVR device and managing the PVR device to make the recording. FIG. 1C represents all start points for features of the system. The majority of process are launched in response to a left click action specific features on the Main Menu Screen 001. It will be appreciated that the layout of this screen and the function supported can vary by installation. Most other processes are launched using a system monitor that watches for computer operating system events 062 or system scheduled events 064. Standalone configuration program 072 is run when certain new functions need to be added to the system. Typically, a user navigates from the Main Menu (200) to a TV function at step 12 to select the TV Guide at step 202. At step 203 a system request to record a future TV program may be issued. The system can typically determine at step 204, that the recording should be on the external PVR based on pre-assigned attributes in the specified Channel Content Object. At step 205, a Scheduled PVR Recording Object can be created with a specified time to launch the PVR record process. At step 206 the system may register a standard record request to enable the user to manage the review or deletion of scheduled recording in a single consolidated process before ending at step 208.

At step 210, the system may be notified that a timed event has occurred. These events can be set to launch within a predetermined time, typically 5 minutes prior to the requested program run time. At step 212 the event may be recognized as an external PVR request. At step 214 a predefined set of commands identified in the PVR Device Object can be sent to the PVR to set it to the PVR TV Guide screen and the channel of the requested program. The system may then move, at step 216, to the next program, the requested program. At step 218, the PVR record command sequence may issue. At step 220 the standard record request may be removed from the system. The system can then increment all existing PVR Video Content Object's Position attributes by 1 at step 222. At step 224 the system may create a new PVR Video Content Object for the recorded program with Position attribute equal to 1. The content can then be made available in the system even while the content is being recorded before the process ends at step 230.

The flowcharts of FIG. 2B illustrate an example of a process for viewing a Video recording stored on external PVR. In the example, it will be assumed that creation of PVR recording was obtained as described in FIG. 2A. Typically, the user navigates from the Main Menu at step 240 to the Video Source function at in Step 241. At step 242 the user may select a Video Content Object using an associated graphical icon displayed on Video Source Menu, typically with an appropriate filter set to display a Video Recording. At step 243, the selected object may be recognized as a PVR Video Content Object and, at step 244, command sequences identified in the PVR Device Object can be sent to the PVR to select a recorded file menu. The system in step 245 may sort files chronologically and may position the PVR pointer to the most recently recorded file. At step 246, the system may step the file pointer down the number of positions (−1) indicated in the selected PVR Video Content Object and can select and play that PVR file. At step 247, the system may set up an appropriate display and controller for a PVR Video Content Object and, in step 248, the associated application for playing a PVR file can be launched and a play command is issued.

Ownership Verification Processes

Copyright protection is a significant issue for most home automation systems. Using existing consumer product DVD jukebox devices, the home digital resource management system can both integrate a users existing hard audio/video content and also ensure copyright protection requirements are met using a verification process such as shown in FIG. 3. In certain embodiments, Digital Media Store capabilities include Registering and Buffering a DVD. In both cases a content object can be generated for new content and the user may be instructed to put the hard media in the associated jukebox device. In the Buffer option an electronic copy of the content is typically generated. Any subsequent requests to view this content may initiate the playback of the electronic copy. In parallel, a request can be transmitted to the home digital resource management system software for verification that the hard copy still resides in the jukebox device.

Turning now to FIG. 3, a flowchart is provided that describes an example of a process for viewing a Video recording that has been stored as a file in the system and has an associated Secured Media attribute. The capture of this form of media typically occurs by a process similar to the New Media Registration process described in conjunction with the example of FIG. 1A, above. Processes are typically employed to both copy the media to a file and register the hard media in the external jukebox. The process can also employ encryption technology to encrypt the recorded file with keys being recorded in the associated Video Content Object. This process may occur when the user selects this content object for playback.

In the example, a user navigates as before from the Main Menu at step 300 to the Video Source function at step 302. At step 302 the user can select a Video Content Object from its graphical icon displayed on the Video Source Menu with appropriate filters set to display a Video Recording. At step 303 the selected object can be recognized as a secure video recording and, at step 304, the associated slot number may be retrieved from Video Content Object where the hard media typically resides. The playback of the file may be allowed to continue in steps 310 and 311 while secure status is being confirmed.

At step 305, command sequences identified in the Jukebox Device Object can be sent to the jukebox to query the content of the specified slot. Typically any external storage device used in this secure media process will have this query capability. More sophisticated storage units may allow query by media name in which case these routines can be incorporated into the devices query command sequence. At step 306 the system may confirm the presence of the media in the hard storage. If the media if not found, then at step 320 a message may be sent to the user that access is denied because hard media is missing. Step 322 terminates playback. At step 324 the selected Video Content Object can be flagged for deletion at a prescribed time, typically within 72 hours after which time, the system can check for the presence of the hard drive and if still not present may delete the recorded file. The process ends at step 312.

Audio/Video Component Switching Management

Traditionally an Audio/Video Receiver/Amplifier component has been at the center of the entertainment management process using its extensive array of connectivity points to provide the media switching in today's home. In certain embodiments of the invention, specialized sets of Home Content Objects can be developed for these receivers for modeling switching capabilities and allowing easily utilization by the user. A default Home Content object can be produced for main connectivity points on the receiver. The user can then assign these objects to specific A/V devices for inclusion in the managed system. With reference to FIG. 14A, this process typically permits both graphical and textual descriptors to be assigned, and can provide help functions to instruct the user on how to connect equipment. Integration can be as simple as allowing a controller pass-through to the new device, but can also permit full management of the device.

Referring now to FIG. 14A, a flowchart is provided that describes an example of a process for connecting a new audio/video device to a managed Receiver Device. This example demonstrates how content objects and help structure can simplify ongoing system configuration tasks. At step 1402, the user can enter the automation service of the system from the Main Menu at step 1400, typically using an Automation button on the Services Function.

In step 1404 the system may use a generic menu structure with specific filters to display all content objects that are Room Content Objects. The user can then select the Living Room Content Object at step 1406. The menu may filter the display to Automation Content Objects contained in the Living Room object at step 1408. Next at step 1410, the user can select the Receiver Content object using, for example, a right click action. The menu may now display the Unassigned Receiver Connection Objects at step 1412. Each of these objects can represent an unused feature on the managed Receiver. In the example, the user selects an S-Video connection at step 1414. At step 1416, the user may enter description information to identify the device that will be connected to the selected receiver port. At step 1418 the user may be given an instructional video on making the physical connections to the receiver. Such help videos can be produced in conjunction with manufacture of the managed device and can contribute to the provision of a Single Learning Curve process. At step 1420, the user may be given the option to make the new connection pass-through device (selection is typically managed for the routing of audio and video to the display but device control is from the devices own controller) or if the device is a supported device the user can choose to enter control codes for its management. At step 1422 the prompting and capture of the IR control sequences can be managed. At step 1424 a new automation control device object for the new device can be created. The process ends at step 1426.

In certain embodiments, an Audio/Video Receiver hardware enhancement provides the ability to switch A/V input sources and direct them to the management system, while simultaneously taking the management system output and routing it to the display and audio devices. See FIG. 14b for an example.

Home Content Object—Display

In certain embodiments, integration provides an improved human interface. Distributable controls, managing varied and extensible content can be obtained by display management. Additionally, the ability to offer the user new ways to enjoy their content and manage their home and time can create clear differentiation from conventional home integration products. In many embodiments, system usability enhancements are obtained from the presentation of content objects to users. Content Objects can be presented in at least two manners including by graphic or textual descriptors (for selection purposes) and as displayed content. Displayed content can include content media only, control features only, or a combination of content media and control features.

In certain embodiments, value is brought to the end user by enabling advanced location and management of user content. By utilizing specialized data management techniques the user may be provided advanced retrieval capability while maintaining an intuitive interface.

Content filtering can provides simplicity of user interaction that can improve the effectiveness of a home automation system, as shown in FIG. 6. Flexible filtering may be achieved by the inclusion of key categorization information in the normalized content definitions and the development of standardized filter selection controllers and processes, supported by simple informative menu structures.

In certain embodiments, the home digital resource management system uses a Heads Up (controller and menus as well as content are displayed on the primary display equipment). This can limit the need for additional costly control screens or complex remote controls. It may also lessen distraction of the user from there enjoyment of the current viewed content. A simple pointing device can be used to select on screen control features and a remote keyboard can also be provided.

Certain embodiments provide general screen rules and specific rules—set in view panels—on how the controls from the pointer are managed and interpreted. Accordingly, different sections of the screen may react differently to input requests.

As shown in the example in FIG. 13, the Scroll feature in the MUSIC menu may perform multiple functions (ALBUM LIST SCROLL, SONG SCROLL, and VOLUME CONTROL) depending on screen position and context.

In many embodiments, view panels can be provided as, for example, shown in FIG. 7. These view panels can be implemented as display structures in which selected content is assigned for presentation. In addition, specific panel behavior can be specified, as well as one or more controllers for content display management. View panels may also be grouped to construct varying content viewing patterns for the user.

FIG. 7 provides two flowcharts that describe an example in which processes of displaying and managing up to 4 concurrent video or computer sessions at the same time are provided. Such features can allow a user to define sets of displays that allow them to enjoy multiple TV broadcasts at once, watch TV while working on a local computer, or having a surveillance camera watching the nursery and backyard while watching TV. The specific features of each multi-screen format may be user definable in the Support Preference section and can be unique to the current user.

In the example, the user navigates from the Main Menu at step 700 and, in step 702, the user may select the Multi-screen Button from the Support Pane. An Action Panel may appear at step 706. The user can select the action Panel icon with 4 equal sized display panels in step 708.

In step 710, the system can arrange the pre-assigned features into four equal display panels. At step 712, all displays may be assured to be active, muted and unpaused. At step 714, the upper left display can be set as unmuted and the controller for the panel may be set to that features controller. Typically, the user can now observe all screens at once at step 716. A left click on a display, step 724 may cause the selected display to become unmuted at step 729 and its controller to be assigned to a new panel at step 726. The previous unmuted panel may also be muted at step 728. By selecting the return to Main Menu icon on the controller the user may be returned to the Main Menu at step 718.

User Identifying Wireless Controller (Simple Pointer)

The physical controller is typically a simple device that interacts with systems head-up display and allows wireless selection of screen based control regions. This device may present two buttons and a scrolling device that plunges as a third button. In addition, the identification of the user through fingerprint recognition may be required. The movement of the pointer can be controlled by hand movement, independent of surface contact. See FIG. 15.

Context Aware Controllers

User interface simplification may require that only pertinent control options are presented at any given time. Controllers can be assigned to view panels with clear definition of the current sate of the content display. Therefore, the controllers need only present the controls for the content in its present context. As shown in FIG. 8, the selection of a TV recording can result in a controller being selected that has the defined functions required to manage the playing of the video and maps those functions to the assigned managed device.

Intelligent Consolidated Menus and Guides

Certain embodiments provide new menu concepts built over content normalization and filtering processes that can shift the nature of a home automation environment from a group of individual control screens for individual devices to a consolidated view of all the information resources in the home, presented as selectable features independent of devices as shown in FIG. 9. An example of such new menu concepts is a request to view a video. A standard filter setting of ALL may present a graphic (or optional text) menu of all videos in the home digital resource management system regardless of source. This could likely include recorded TV programs from both the cable system and HDT terrestrial sources, any DVD stored in system storage, all DVD in jukeboxes and any individual DVD in system drives. A simple filter change to WITHIN 24 HOURS can add all TV movies scheduled to broadcast over the selected time period as well as any movies available for electronic download in the same time period. Other filters may isolate the selection by genre, actor, favorite or a variety of other criteria. The user need not be aware of the physical location of the viewed media and can focus on availability, cost if any, and content description.

This paradigm may be applied to all available content. Content requests can also include, for example, MOM'S MUSIC, HOME CONTROL DEVICES, ALL CURRENT NFL GAME BROADCASTS, ACTIVE LOCAL COMPUTERS, JIMMY STEWART MOVIES, CHRISTMAS PHOTOS, VIDEOCONFERENCE LINKS and SECURITY CAMERAS.

Display Portability

Certain embodiments comprise a process to provide universal access to any controllable devices in the home. Thus the presentation of all Content Devices in one menu regardless of function can be permitted. This method can allow iterative filtering of the Content Objects until the desired subset of objects is presented. This method can be made available on the management system as well as other computer, PDAs and mobile devices for universal access to Content Devices across the home. Content Device attributes may be set to implement varying levels of security including restriction by controller, by user, by time of day, and by password.

Home Content Object—Enhanced Management

In certain embodiments, the home content object can provide an accessible architecture that permits the integration of more advanced services. Each object can facilitate new attributes that will allow more meaningful use of the managed features. For example, video objects may have color and sound adjustments imbedded in them. In another example, individual TV channels can be associated with information including favorite, usage restriction, video treatment and grouping information. Such advanced functionalities can be provided as upgrades and can be installed as software upgrades obtained by, for example, Internet download. Coupled with attributes in other system objects, such as the User Object, powerful management capabilities can be included in the system.

FIG. 4C provides a flowchart that describes an example of a process of a user, operating the system and choosing a TV Program for viewing. At step 440, the system monitor detects a user entering the system. Detection can include fingerprint recognition whereby the user presses a thumb against the physical fingerprint reader associated with the hand controller. Some system can have the fingerprint reader adjacent to the hand controller charging station, in other systems the reader will be built in the hand controller—see FIG. 15. In many embodiments one or more identification systems can be used including passwords, RFID, biometric systems such as iris, voice recognition and so on.

At step 441 the system compares the read fingerprint to a set of user prints in its database. In the example, the user is identified as 14 year old Jeanie with User Object (4061-DS). Accordingly, current user may be set to Jeanie at step 442. At step 443, the system sets the current system to user Jeanie's personal settings, including resetting display features to previous defined settings for the user, setting default menu filters to Jeanie's preferences and displays Jeanie's main menu at step 444. At Steps 445,446 and 447 Jeanie navigates the system and selects a current TV broadcast from the TV Guide. At step 448, the system retrieves program details from the TV guide process and constructs the Current TV Content Object (4052-DS). At step 449 the system then retrieves attributes from that object for the media's Industry Rating and compares that to the Highest Usage Rating in Jeanie user object. If the rating is higher the process can proceed to 450

Step 450 retrieves from the contained in Channel Content Object (4051-DS) for the Current TV Content Object (4052-DS) attributes values for Usage Rating. The system gets the Jeanie's User object's attributes of Limit and Usage for that Usage Rating. If the Usage is not less than the Limit proceed to Step 452. Else proceed to content display in step 451. At step 452 a message is issued to the user saying the material they selected is unavailable because of usage restrictions. The user is returned to previous menu. At step 453 system presents the selected material. The process ends at step 456.

Single Learning Curve

Certain embodiments make the use of technology as simple as possible for the home consumer. To achieve this, the system can readily manage the users current equipment in a consolidated and intuitive manner and the system can allow for the introduction of new technology in a manner that the user can intuitively learn the use of that technology on a need to know and iterative manner. The system can provides this ease of use in 3 ways: simplified and familiar graphics, integrated self help, and video learning aids.

Familiar graphics

Common and familiar graphics can be achieved by first minimizing the number of functions required to manage functions such as watching video material and normalizing controller layout across these common functions. The user may then use the same process to manage watching TV, a DVD, a prerecorded TV program or their home movies. Secondly the system can use similar graphics across functions. For example the graphic indicating increases the volume on a video display, can be used on a different display to increase the temperature of a swimming pool, and on another to increase the brightness of a lamp. When a new function is introduced the user typically sees this graphic and understands its meaning as varying some characteristic. Thirdly, the use of the same graphic menu structure across all content object including photo, videos, music and automation devices can make the locating of feature very intuitive.

Finally, the home digital resource management system typically uses extensive use of graphics to enhance and simplify the user interfaces. The main menu function can use live video feeds to inform the user of the current viewing options. FIG. 12 shows Audio and Video menus which use album and cover art images to focus the selection process. Other content sources use standard, product or regional graphics to distinguish themselves. These images can include a surveillance camera image, local radio station logos, and game system symbol. To visually augment these content graphics a content cassette encloses the graphic and indicates key information about the content to the user. Info include TYPE (TV Recording, Home Automation Device), PENDING ACTION (Time Deletion), and CURRENT SELECTION Integrated Self Help To assure that the user is comfortable in their understanding of these simplified controls, help can be embedded throughout the home digital resource management system.

As shown in FIG. 10, layer one may be designated as an information field on each controller that, upon selection of a graphical control element, can display a brief command description for the user. As shown in FIG. 11, a second level of help may be obtained by right clicking on the controller itself which will typically bring up detailed descriptions of all the controllers features. Additional help is typically available for general function by right clicking on the control panel or in the support menu. And finally, instruction tutorials can walk the user through the complete system capability.

Video Learning Aids

In certain embodiments, the system uses prerecorded videos to walk the user through the use of varied functions in the system. The user can actually see the functions being used and audio commentary is provided. This feature can facilitate the introduction of new services and also can be used in the initial set up the system. New features may be accompanied with one or more video aids that can describe the physical connections, installation process that need manual input, and finally instruct the user on using the new feature.

Reference Architecture

To provide the user with access to the simplified management aspects of the system over a period of time certain embodiments establish a hardware architecture that allows for expandability and user facilitated upgrades. See FIG. 16. This ability can make the main computer as generic as possible and deliver it in a server (field upgradeable). To achieve this, Agents can be used to isolate and distribute hardware and software capability that will make the associated managed feature addressable in computer format (IP) to the Server. Similarly Client devices can distribute the systems display from the server to devices throughout the home.

Server

In certain embodiments, the server provides core processing and storage capabilities. The agents and client described below can isolate the server from the complexity of the managed devices and allow the server to remain as generic computer processing platform. The server can typically add or upgrade key resource such as CPU and Hard Drive capacity.

Normalization Agent

Certain embodiments comprise a device that manages the interaction with an external device and creates a Content Device object. This device may be designed to convert an audio/video stream video and/or control sequences and make them manageable over a network such as an IP network. The device may include one or more audio/video connections (S-Video, Component, Composite, DVI, HDMI video; audio, RCA, coax or optical audio), one or more control connections (IR, RS232), and an Ethernet connection (wired, wireless or power line). The Audio/Video stream may be captured in device memory and presented as a stream or file to a remote managing application. A method can be provided to record or enter control sequences for the type of device being managed. These controls can be initiated from the management application and sent via IP to the device which then delivers it to the managed external device. See FIG. 17.

Distribution Client

Certain embodiments comprise a device that distributes the display components of the management system to a plurality of display devices in the home that are not computer based. These clients can also be configured to relay control requests from the distributed point back to the server to manage application flow. In certain embodiments, "media extender" products can be modifiable to perform this function. However, certain embodiments further provide an ability to superimpose control graphics over video material presentation at the client site to allow dynamic presentation on the systems head-up control capabilities. Clients may also interpret controller selections of these control elements and relay that information back to the server.

Access Client

In certain embodiments, an access client may perform the same function as the distribution client as well as provides a point for the user to input new media into the system. The unit may contain a combination of DVD/CD drives, USB ports, and Firewire ports. In addition, the box could be configured to function as a normalization agent and contain media and control connectivity as well. The unit can be connected back to the server by IP or USB connectivity. This access client may allow the user to input new content objects to the system without needing to be near the server. It can decrease or eliminate the noise and heat traditionally associated with media servers in the main living spaces of the home.

ADDITIONAL DESCRIPTIONS OF CERTAIN ASPECTS OF THE INVENTION

Certain embodiments provide a method for monitoring user media usage patterns for the purposes of capturing content within the home digital resource management system—monitored element would include all managed DVD drives, CD drives, USB port, flashcard readers, web site accesses, photo or video applications, radio and TV broadcast.

In some of these embodiments, a method is described that for creating a Content Device object for new media connected to the immediate computer or managed network computers via USB connection, DVD/CD media insertion, or flash card insertion. Monitor managed computers for defined device insertion and identify any file or media content that would be of interest to the user. Query user with an action prompt for the identified media. If the user decides to retain media create all appropriate Content Device information by query the internet or local libraries for graphical and descriptive details, applying context attribute such as time and user information. The new content will then appear throughout the system as defined in selection processes.

In some of these embodiments, a method is provided for creating a Content Device object for new media files detected in the immediate computer or managed network computers. Periodically scan all defined file structures in the system for new files. Create all appropriate Content Device information by querying the internet or local libraries for graphical and descriptive details, applying context attributes such as time and user information. The new content will then appear throughout the system as defined in the selection processes.

In some of these embodiments, a method is provided for associating specific management requests to a specific class of device that requires positional or cursor based remote management routines and automating the process for capture and emulation of those routine.

In some of these embodiments, a method is provided for creating a Content Device object and to schedule a recording on a managed external PVR. The method recognizes any request for a scheduled recording and checks the database for channel recording destination. If a PVR destination is specified, the method creates a PVR record object with a wake up time prior to scheduled record time. Standard computer recording process is set up normally so that a single schedule is maintained. The system reacts to the PVR record object request just prior (30 second to 5 min) to the scheduled record time. The method issues a set of instructions to the PVR to locate the requested program by channel and time to record, and sets the PVR to record that program. The method then deletes the standard recording process request. The PVR record object is then modified to reflect the time, chronological order of the new recording on the PVR, and a new Content Device for the recording is produced. To the end user, the recording process being used is transparent, unless specific filters for PVR recordings are used. On selecting a Content Device for a PVR recording, a set of instructions are sent to the PVR to select the recording by chronological positions on the PVR. A specific controller for the PVR is assigned to control the recording playback. This method could be modified if the managed PVR allows query functions on its recording list. In this method the recording would be selected by recorded title name rather then retained position number.

In some of these embodiments, a method is provided for using commercially available mass DVD and CD store devices to confirm the presence of a legal copy of DVD, CD or other copy protected material so that a single stored copy of the material is used within the home digital resource management system.

In some of these embodiments, a method is provided for creating a Content Device object for an individual DVD/CD in managed external JukeBox DVD/CD player. The user selects the "Register" option when replying to the action prompt for a new DVD or CD. The method creates all remaining Content Device information by querying the internet or local libraries for graphical and descriptive details, applying context attributes such as time and user information. The method then assigns the next available slot in the managed Jukebox device and stores that attribute in the Content Device. Known slot is either managed in the method or queried from the managed Jukebox if it supports that function. The new content will then appear throughout the system as defined in selection processes. On selecting a Content Device for a Registered DVD/CD a set of instructions are sent to the Jukebox to select the media by slot position on the Jukebox.

In some of these embodiments, a method is provided for creating a Content Device object for a secure online copy an individual DVD/CD in managed external JukeBox DVD/CD player. The user selects the "Rip" option when replying to the action prompt for a new DVD or CD. The method creates all remaining Content Device information by querying the internet or local libraries for graphical and descriptive details, applying context attributes such as time and user information. The DVD/CD is then recorded on the computer hard drive. The method then assigns the next available slot in the managed Jukebox device and stores that attribute in the Content Device. The new content will then appear throughout the system as defined in selection processes. On selecting a Content Device for a Registered DVD/CD a set of instruction are sent to the Jukebox to verify that the DVD/CD is in the Jukebox. If present the recorded version of the media is presented, if not present, the user is informed that the media is unavailable. These unavailable recordings will be removed after a set period of time if the hard DVD/CD is not replaced in the Jukebox.

In some of these embodiments, a method is provided for capturing and storing individual managed device configuration data so that the home digital resource management system automatically sets device to known state at system configuration, system restart or system restore points. These processes will be transparent to the system user.

In some of these embodiments, a method is provided for defining in a computer database a source of content (Content Device) that is managed via Controllers and presented in Content Panels. To allow these Content Devices to be given definable attributes for: device type; command sequences (in varied protocols) to control the Content Devices behavior; categories that are used to prioritize, restrict, record, or measure Content Devices usage; preferences for selection processes, or audio video treatment; graphic and textual identification; and additional descriptive information. These Content Devices will be dynamically assigned to Content Panels. Device to be model include but are not restricted to: A/V Components (DVD, TV Set top, CD Players, TVs, Receivers), Computer Files and components (MP3, photo and MPEG files, PCI cards, USB devices, applications and the internet) ; home control functions (lights, thermostats, pool and spa, cameras, irrigation). Content Devices inherit attributes from other Content Devices (A TV Channel has the same command sequences of the Satellite set top that it is delivered on)

In some of these embodiments, a method is provided for launching activities or processes from a Content Device definition. The Content Device object is the bases for feature selection in the management system. Content Devices are selected from menus by clicking their graphical or textual identifiers or by selecting a current Control Panel with a pre assigned Content Device. The selection method uses the Control Panel attributes to selectively launch applications, send command sequences, assign Content Panels and Controllers and adjust other active Content Devices for performance purposes. The management system allows for multiple Content Devices to be active at one time, both locally and across the network.

In some of these embodiments, a method and data structure is provided for presenting all digitally manageable addressable resources defined within a user domain as accessible useable content and independent from the actual managed devices.

In some of these embodiments, a set of methods is provided for capturing unique attributes and associate those to the content definitions in "5" above for use in intelligent content selection and review. Methods will incorporate varying procedures for attribute population including manual entry, specific user usage recognition, entry processes as in "1" above, Web detail sources, managed device queries, managed device default configuration as well as standard sort criteria (numerical, alphabetical, chronological, etc).

In some of these embodiments, a method is provided for using and configuring intelligent filtering gadgets to present intuitive selection requirement to the home digital resource management user. Gadget will be context sensitive and graphically presented.

In some of these embodiments, a method is provided for displaying the addressable Content Devices to the user for selection. To display the graphical identification for each Content Device augmented by the textual or information in a consistent fashion across all the Content Device types. To allow these Controllers to be given definable attributes for filtering displayed items based on Content Device and User Profile attributes. Common selection criteria would be device type, title, artist, favorites, genre, time, usage allowance and alphabetical sorting.

In some of these embodiments, a method is provided for providing universal access to any controllable device in the home. The method will allow the presentation of all Content Device in one menu regardless of function. The method will allow iterative filtering of the Content Devices until the desires control menu is presented. The method is evoked as part of the management system configuration or in a real time environment. This method will be made available on the management system as well as other computer, PDA and mobile devices for universal access to Content Devices across the home. Content Device attributes are set to implement varying levels of security including restriction by controller, by user, by time of day, and by password.

In some of these embodiments, a method is provided for presenting content to the user. Content is directly or dynamically assigned to Views. Each view will contain default control definitions which in turn are dynamically reassigned. Views are also be grouped providing for maximum flexibility in constructing the presentation and viewing pattern to the user.

In some of these embodiments, a method is provided for defining in a computer database a displayable window (Content Panels) for the presentation of all or some, or groups of, video, audio, and control content. To allow these Content Panels to be given definable attributes for appearance, sizing, positioning with other display elements, audio/video treatments and any other attributes that would allow these Content Panels to better display information to the user.

In some of these embodiments, a method is provided for creating using and configuring graphical controllers that present context aware control functions while dynamically linking those functions to the associated managed device or devices.

In some of these embodiments, a method is provided for defining in a computer database a graphical controller (Controllers) that allow the user to interact with the selected Content Devices and be assigned to Content Panels. To allow these Controllers to be given definable attributes for: permanent and optional control buttons; appearance, position, style and sizing: method and timing of Controller display within Content Panel.

In some of these embodiments, a method is provided for representing content information in graphic or textual format based on the current selection criteria but independent of managed device. Using groups with associations to content and group of content method informative resource representations are presented and controlled by default View control.

In some of these embodiments, a method is provided for incorporating imbedded help and support capabilities in a layered fashion throughout the home digital resource management system. Help information will be supplied intuitively in the controller construction, as a function on physical pointer action including mouse over and right click actions, and specifically in help, demo and tutorial function presented as part of the support functions. Online help interaction is also provided.

In some of these embodiments, a method is provided for allowing the user immediate clarification of use for features they are about to select. The method will provide an information window on each Controller that will supply the user with details on the control feature they currently have the pointing device over. The method will draw information from the Controller object and also from region data in the Content panel definition to provide this function.

In some of these embodiments, a method is provided for allowing a user to acquire extended procedural help for the Control Device they are currently in or are about to select from the main menu. A right click from the control device function over the Controller, or Content Panel will provide the user with detailed descriptions of what the function is and how to use it. Where reasonable, this information will be maintained in 2 formats, textual instructions and informational videos.

In some of these embodiments, a method is provided for graphically representing key attributes of the content. A "cassette" graphic element will enclose the specific or default core graphic associated with each content item and assist the user in identifying pertinent information about the item. This information includes: Content Type; State conditions such as Currently Playing, Current Selection or pending Automatic Deletion; and any other content attribute that would make the user interface more intuitive.

In some of these embodiments, a method is provided for managing all external system interactions within the context of the current view. All physical controller actions will be registered as to function and location and then verified to the current view and controller for processing. Process options include ignore, pass to controller, pass on to view, pass to underlying third party application.

In some of these embodiments, a method is provided for defining in a computer database a user (User Profile) that allow the user to interact with the selected Content Devices. To allow these User Profiles to be given definable attributes for: categories that are used to prioritize, restrict, record, or measure Content Devices usage.

In some of these embodiments, a method is provided for manually creating a Content Device. Prompt user for titling information, graphic and descriptive data and specific information defined by Content Panel type. The content types that this process will apply to include but is not restricted to new, radio stations, TV stations, automation devices, audio play lists, and internet sites. Create all remaining Content Device information by querying the internet or local libraries for graphical and descriptive details, applying context attributes, such as time and user information. The new content will then appear throughout the system as defined in selection processes.

In some of these embodiments, a method is provided for assigning defined Content Device objects, for managed external Audio/Video receiver, to specific user equipment. When integrating an Audio/Video receiver specific Content Devices are specified for connectivity features presented on the receiver. This would allow the user to plug new a/v components (VCRs, cameras, etc) into the spare ports on their receiver and then use this method to activate and customize the Content Device definition to make the new component available in their system. The method would allow the user to select unused connections, select appropriate graphic and textual identification and make the content throughout the system as defined in the selection processes. The method also offers graphical help to instruct the user on how to physically connect the system. The method will also present the option of making the new Content Device a pass-through device (controlled by the devices traditional controller), or a known managed device in which specific standard controls are captured via a setup method and emitted through a broadcast IR emitter.

In some of these embodiments, a device is provided for managing the interaction with an external device and creates a Content Device object. This device is designed to convert the audio/video stream video and/or control sequences and make them manageable over an IP network. The device will contain one or more audio/video connections (S-Video, Component, Composite, DVI, HDMI video; audio, RCA, coax or optical audio), one or more control connections (IR, RS232), and an Ethernet connection (wired, wireless or power line). The Audio/Video stream will be captured in the device's memory and presented as a stream or file to the remote managing application. A method will be developed to record or enter control sequences for the type of device being managed. These controls will be initiated from the management application and sent via IP to the device which then delivers it to the managed external device.

In some of these embodiments, a modified audio/video receiver device is provided for providing the ability to switch A/V input sources and direct them to the management system, while taking the management system output and routing it to the display and audio devices.

In some of these embodiments, a device is provided for interacting with the computer and allows wireless selection of screen based control regions, the identification of the user through fingerprint recognition and allows the movement of the pointer via hand movement alone, independent of a surface contact.

Although the present invention has been described in detail with reference to the disclosed embodiments thereof, those skilled in the art will appreciate that various substitutions and modifications are made to the examples described herein while remaining within the spirit and scope of the invention. Accordingly, those skilled in the arts may make changes and modifications and employ equivalents without departing from the spirit of the invention.

What is claimed is:

1. A method for controlling a home environment comprising the steps of:
   receiving an indication of insertion of a component into the home environment;
   where the component has been previously identified in the home environment, associating the component with a corresponding object characterizing the component;
   where the component is unidentified in the home environment, characterizing features of the component responsive to user input, and
   generating a component object associating the characterized features with the component; and
   adding the component object to a list of objects comprising objects identifying available resources in the home environment including objects corresponding to multimedia content available to one or more devices and at least one object corresponding to a multimedia player.

2. The method of claim 1, wherein the step of generating the component object includes associating the component object with a user.

3. The method of claim 2, wherein associating the component object with the user includes
   providing the user with access to the component, and
   updating access rights in a user object corresponding to the user.

4. The method of claim 3, wherein the user object is maintained in the list of objects.

5. The method of claim 3, wherein the user object includes presentation preferences of the user.

6. The method of claim 1, wherein characterizing features of the component includes querying a user for the user input.

7. The method of claim 6, wherein the component includes multimedia content and the user input includes a decision regarding retention of the multimedia content.

8. The method of claim 1, wherein characterizing features of the component includes populating the component object with information obtained by interrogation of a network.

9. The method of claim 1, wherein the list of objects includes presentation objects.

10. The method of claim 9, wherein certain of the presentation objects include one or more menus.

11. The method of claim 9, wherein certain of the presentation objects include a history of use of the component.

12. The method of claim 9, wherein certain of the presentation objects include scheduling information.

13. The method of claim 9, wherein certain of the presentation objects include help information.

14. The method of claim 1, and further comprising normalizing the characterized features to a common set of features identifiable by a resource manager.

* * * * *